United States Patent
Sasaki

(10) Patent No.: US 6,937,240 B2
(45) Date of Patent: Aug. 30, 2005

(54) METHODS AND APPARATUS FOR TRANSFORMING THREE-DIMENSIONAL OBJECTS IN VIDEO GAMES

(75) Inventor: Ryusuke Sasaki, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 286 days.

(21) Appl. No.: 09/771,111

(22) Filed: Jan. 26, 2001

(65) Prior Publication Data

US 2001/0019333 A1 Sep. 6, 2001

(30) Foreign Application Priority Data

Jan. 27, 2000 (JP) .................................... P2000-019172

(51) Int. Cl.[7] ............................................. G06T 15/70
(52) U.S. Cl. ........................ 345/473; 345/474; 345/475
(58) Field of Search ................................ 345/473, 474, 345/475, 653

(56) References Cited

U.S. PATENT DOCUMENTS

| | | | |
|---|---|---|---|
| 5,877,778 A | * 3/1999 | Dow et al. | 345/474 |
| 6,317,130 B1 | * 11/2001 | Ishikawa et al. | 345/473 |
| 6,384,819 B1 | * 5/2002 | Hunter | 345/418 |
| 6,515,669 B1 | * 2/2003 | Mohri | 345/474 |

FOREIGN PATENT DOCUMENTS

| | | | |
|---|---|---|---|
| JP | 10-074270 | 3/1998 | G06T/15/70 |
| JP | 2000-242811 | 9/2000 | G06T/17/00 |

* cited by examiner

*Primary Examiner*—Mark Zimmerman
*Assistant Examiner*—Enrique L. Santiago
(74) *Attorney, Agent, or Firm*—Beyer, Weaver & Thomas LLP

(57) ABSTRACT

In the present invention, for an unprocessed joint, a joint index and a joint rotation angle are obtained (S25, S27). For the unprocessed vertex corresponding to the obtained joint index, a vertex index and a weight w for the vertex are obtained. On the basis of the weight w and the rotation angle in the current frame, coordinate values of the vertex buffer are changed. A quarternion q1 according to the joint rotation angle in the current frame and a unit quarternion are sphere-linear interpolated with the weight w. From the resultant quarternion q, a conversion matrix R is determined for the joint. An overall conversion matrix M is obtained as M=RJTB, where a matrix T represents a relative coordinates from a parent joint, a matrix J represents a basic rotation angle, and B denotes a conversion matrix of the parent joint.

2 Claims, 17 Drawing Sheets

Fig.2

| INDEX | COORDINATES (x,y,z) |
|---|---|
| vtx0 | ( 0 , 0 , 0 ) |
| vtx1 | ( 0 , 0 , 100) |
| vtx2 | ( 0 , 100, 0 ) |
| vtx3 | ( 0 , 100, 100) |
| vtx4 | ( 100, 0 , 0 ) |
| ⋮ | ⋮ |

Fig.3

| INDEX | NORMAL VECTOR (x,y,z) |
|---|---|
| nml0 | ( 1 , 0 , 0 ) |
| nml1 | ( -1 , 0 , 0 ) |
| nml2 | ( 0 , 0 , -1 ) |
| nml3 | ( -1 , -1 , 0 ) |
| nml4 | ( 0 , -1 , 0 ) |
| ⋮ | ⋮ |

| INDEX (410) | VERTEX 0 (420) | VERTEX 1 (430) | VERTEX 2 (440) |
|---|---|---|---|
| plg0 | vtx0 / nml0 | vtx1 / nml2 | vtx2 / nml3 |
| plg1 | vtx0 / nml1 | vtx2 / nml3 | vtx3 / nml4 |
| ⋮ | ⋮ | ⋮ | ⋮ |

VERTEX GROUP LIST

| | | | | | | | | | |
|---|---|---|---|---|---|---|---|---|---|
| 510 — NUMBER OF GROUPS | 3 | | | | | | | | |
| 520 — NUMBER OF MEMBERS | 4 | | | | | | | | |
| 530 — VERTEX | vtx1 | WEIGHT (540) | 1.0 | NUMBER OF NORMALS (570) | 2 | NORMALS (591) | nml0 | nml1 | |
| 532 — VERTEX | vtx2 | WEIGHT (542) | 1.0 | NUMBER OF NORMALS (572) | 1 | NORMALS (592) | nml10 | | |
| 534 — VERTEX | vtx3 | WEIGHT (544) | 1.0 | NUMBER OF NORMALS (574) | 1 | NORMALS (593) | nml2 | | |
| 536 — VERTEX | vtx4 | WEIGHT (546) | 1.0 | NUMBER OF NORMALS (576) | 2 | NORMALS (594) | nml3 | nml1 | |
| 522 — NUMBER OF MEMBERS | 4 | | | | | | | | |
| 550 — VERTEX | vtx5 | WEIGHT (560) | 0.5 | NUMBER OF NORMALS (580) | 1 | NORMALS (595) | nml11 | | |
| 552 — VERTEX | vtx6 | WEIGHT (562) | 0.5 | NUMBER OF NORMALS (582) | 1 | NORMALS (596) | nml4 | | |
| 554 — VERTEX | vtx7 | WEIGHT (564) | 1.0 | NUMBER OF NORMALS (584) | 1 | NORMALS (597) | nml5 | | |
| 556 — VERTEX | vtx8 | WEIGHT (566) | 1.0 | NUMBER OF NORMALS (586) | 3 | NORMALS (598) | nml6 | nml8 | nml9 |
| 524 — NUMBER OF MEMBERS | 1 | | | | | | | | |
| 558 — VERTEX | vtx7 | WEIGHT (568) | 0.5 | NUMBER OF NORMALS (588) | 1 | NORMALS (599) | nml7 | | |

VERTEX GROUP 0 (rows 530–536)
VERTEX GROUP 1 (rows 550–556)
VERTEX GROUP 2 (row 558)

Fig.8

| | | |
|---|---|---|
| 610 | Root index | root |
| 612 | Basic parallel movement amount (x, y, z) | (0, 0, 0) |
| 614 | Basic Rotation angle (Rx, Ry, Rz) | (0, 0, 90) |
| 616 | Number of joints | 4 |
| 620 | Joint index | Joint0 |
| 622 | Parent index | root |
| 624 | Basic parallel movement amount (x, y, z) | (90, 20, 0) |
| 626 | Basic Rotation angle (Rx, Ry, Rz) | (0, 0, 135) |
| 628 | Number of vertex groups | 2 |
| 630 | Vertex group number | 0 |
| 632 | Vertex group number | 2 |
| 640 | Joint index | Joint1 |
| 642 | Parent index | Joint0 |
| 644 | Basic parallel movement amount (x, y, z) | (40, 0, 0) |
| 646 | Basic Rotation angle (Rx, Ry, Rz) | (0, 0, 45) |
| 648 | Number of vertex groups | 1 |
| 650 | Vertex group number | 1 |

600 — Joint 0 (rows 620–632), Joint 1 (rows 640–650)

Fig.9A

| Number of joints (710) | Number of frames (720) | 700A |
|---|---|---|
| 2 | 10 | |

Fig.9B

| Joint index (730) | Rotation angle (Rx, Ry, Rz) (740) | |
|---|---|---|
| Joint0 | (0, 0, 0) | Frame0 |
| Joint1 | (0, 0, 0) | |
| Joint0 | (10, 0, 135) | Frame1 |
| Joint1 | (−10, 5, 45) | |
| ⋮ | ⋮ | |
| Joint0 | (90, 0, 150) | Frame9 |
| Joint1 | (−90, 45, 45) | |

| Joint index | Matrix data |
|---|---|
| root | Root conversion matrix |
| joint0 | Conversion matrix with 100% weight of joint0 |
| joint1 | Conversion matrix with 100% weight of joint1 |

Fig.15

| Weight | Weight |
|---|---|
| matrix buffer | Conversion matrix according to weight of joint being processed |

METHODS AND APPARATUS FOR TRANSFORMING THREE-DIMENSIONAL OBJECTS IN VIDEO GAMES

BACKGROUND OF THE INVENTION

1. Field of the Invention

The present invention relates to the computer graphics (CG), more particularly to the technique of transforming three-dimensional objects in a virtual three-dimensional space.

2. Related Background Art

In the field of computer graphics, a technique called skeleton transformation is conventionally known for expressing the actions of a three-dimensional object by changing the shape of the object determined with a plural number of vertexes. To perform the skeleton transformation, a plural number of virtual joints and bones are set in the three-dimensional object, the bones and joints are connected together in a hierarchy to form a set of bone data (called a skeleton), and the shape of the skeleton is changed.

For example, the neck portion of a human-shaped, three-dimensional object is provided with a neck joint which in turn is connected to the head bone made to correspond to the head portion of the human-shaped three-dimensional object. In this case, when the neck joint is rotated, the head bone is also rotated. The head portion of the human-shaped three-dimensional object corresponding to the head bone rotates according to the rotation of the head bone. As a result, the skeleton is transformed, and the three-dimensional object corresponding to the skeleton can be transformed.

However, when the three-dimensional object corresponding to the skeleton is transformed by transforming the skeleton in a simple manner, there may be a case in which the three-dimensional object cannot be displayed in a smooth shape since the vertexes of the three-dimensional object are buried inside the three-dimensional object or some of the polygons become too large.

Therefore, a technique as described in Japanese Patent Laid-open Publication No. Hei-10-74270 has been invented. This publication discloses a technique with which, when the direction data of a child virtual skeleton is to be changed, the position data of the vertex of the polygon corresponding to the child virtual skeleton is determined on the basis of: the position data of the vertex before being changed; the position data of the vertex determined from the direction data without using an influence degree data; and the influence degree data from the parent virtual skeleton and the child virtual skeleton set to each vertex.

The Japanese Patent Laid-open publication No. Hei-10-74270 further discloses that the position data of the vertex before being changed is used, which is possible if there is no movement of the virtual skeleton in the hierarchy higher than that of a child virtual skeleton. However, if there is any such movement, the position data of the vertex in the state must be calculated taking into consideration all the movement up to the parent skeleton. In many cases, two sets of position data of the vertex must be calculated by vertex conversion, from the position data of the vertex obtained from the direction data without using an influence degree data and the position data of the vertex in the state taking into consideration all the movement to the parent skeleton.

In other words, with the technique disclosed in the Japanese Patent Laid-open publication No. Hei-10-74270, the vertex conversion for each vertex is twice that of the case in which smoothness of shape is not required. As a result, the amount of processing required to keep the shape smooth increases with the increase in the number of vertexes for expressing the three-dimensional object.

Generally speaking, the greater the smoothness desired of the three-dimensional object, the greater becomes the number of vertexes for defining the shape of the three-dimensional object. Therefore, it is desired that the processing amount for making the shape smooth after transformation can be minimized even where the number of vertexes of the three-dimensional object increases.

SUMMARY OF THE INVENTION

The object of the invention is to provide a technique for transforming a three-dimensional object while maintaining a smooth shape and holding down the increase in the amount of process load accompanying the increase in the number of vertexes of the three-dimensional object.

A computer-readable recording medium for a video game, with the medium recording a video game program for transforming a three-dimensional object having a shape defined with a plurality of vertexes, in accordance with a first aspect of the present invention, the program causing the computer to obtain the rotation angle of each joint in a virtual skeleton of the three-dimensional object constituted with a plurality of joints with each of the plurality of vertexes made to correspond to any one of the plurality of joints according to animation data defining the movement of the virtual skeleton at every frame display period and to calculate the rotation angle of the vertex on the basis of the obtained rotation angle of each joint and a weight predefined to the vertex corresponding to the joint, and to move the vertex according to the rotation angle at every frame display period.

The rotation angle of the vertex is determined by changing the rotation angle of the joint corresponding to the vertex according to the weight predefined for the vertex. As the vertex is moved according to the rotation angle of the vertex, vertex conversion is required only once.

The computer-readable recording medium can be configured so that in the movement of the vertex, the rotation angle of the vertex is calculated on the basis of one rotation angle relative to one rotation axis determined with the obtained rotation angle of the joint and the weight predefined to the vertex corresponding to the joint and the vertex is moved to a position obtained by rotating the vertex through the rotation angle about the one rotation axis.

The computer-readable recording medium can be configured so that, in the movement of vertex, the rotation angle of the vertex is calculated on the basis of a rotation angle relative to one rotation axis determined with the rotation angle of the joint obtained in the first step, and the vertex is moved to the position obtained by rotating the vertex by the calculated rotation angle about the one rotation axis at every frame display period. It is arranged that the vertex is moved through a shortest distance.

The computer-readable recording medium can be configured so that, in the obtaining of the rotation angle, the rotation angles of the joints for the three rotation axes intersecting at right angles are obtained in the movement of the vertex, and in the movement of the vertex, one rotation axis and one rotation angle are calculated on the basis of the rotation angles for the three rotation axes of the joints obtained in the obtaining of the rotation angle of the joint, the rotation angle of the vertex is calculated by interpolating the calculated rotation angle according to the weight predefined to the vertex, and the vertex is moved the vertex at every frame display period according to the rotation angle and the one rotation axis calculated in the calculation of the rotation angle of the vertex.

The recording medium can be configured so that in the above calculation of the rotation angle of the joint, the one rotation angle is sphere-linear-interpolated according to the weight predefined to the vertex to calculate the rotation angle of the vertex.

The recording medium can be configured so that the vertex corresponding to the one joint is sorted with the weight predefined for the vertex, and in the movement of the vertex, a determination is made whether the same weight as that predefined to the vertex moved immediately before is defined to the vertex to be moved, when it is determined that the same weight as that predefined to the vertex moved immediately before is not defined to the vertex to be moved, the rotation angle of the vertex to be moved is calculated on the basis of the obtained rotation angle of the joint corresponding to the vertex to be moved and the weight predefined to the vertex to be moved, and data on the rotation angle is stored, the vertex to be moved is moved according to the stored data on the rotation angle, and when it is determined that the same weight as that predefined to the vertex moved immediately before is defined to the vertex to be moved, the vertex to be moved is moved according to the stored data on the rotation angle.

The recording medium can be configured so that in the movement of the vertex, a determination is made whether the same weight as that predefined to the already moved vertex among the vertexes corresponding to the same joints is defined to the vertex to be moved, when it is determined that the same weight as that predefined to the already moved vertex among the vertexes corresponding to the same joints is not defined to the vertex to be moved, the rotation angle of the vertex is calculated according to the obtained rotation angle of the joint corresponding to the vertex to be moved and the weight predefined to the vertex to be moved, and the data on the rotation angle is associated with the weight of the vertex and stored, the vertex to be moved is moved according to the calculated rotation angle, and when it is determined that the same weight as that predefined to the already moved vertex among the vertexes corresponding to the same joints is defined to the vertex to be moved, the data on the rotation angle stored as associated with the weight predefined to the vertex to be moved is obtained, and the vertex to be moved is moved according to the data on the rotation angle.

It is possible to create a program that makes a computer execute a method for transforming three-dimensional objects in a video game related to the first embodiment of the invention. In that case, the above-described transformation is also applicable to such a program. The programs according to the present invention may be stored in recording media or recording devices such as a CD-ROM (compact-disk read-only memory), a DVD (digital versatile disk), a floppy disk, a memory cartridge, a memory, and a hard disk. Video game apparatuses described below may be realized by making computers read programs stored in the recording media and memory devices. Programs related to the present invention may be easily distributed or sold as software products on recording media independent of apparatuses. The graphics technique of the present invention may be easily put to practical use by executing programs of the present invention in hardware such as computers.

In accordance with the second aspect of the present invention, a video game apparatus for transforming a three-dimensional object having a form at least a part of which is determined by a plurality of vertexes associated with a cluster, said apparatus having: a computer and a computer-readable recording medium having recorded therein a program to be executed by said computer, the program causing said computer to execute, obtaining the rotation angle of each joint in a virtual skeleton of the three-dimensional object which is constituted with a plurality of joints and in which each of the plurality of vertexes corresponds to any one of the plurality of the joints at every frame display period, according to the basis of the animation data defining the movement of the virtual skeleton, and calculating the rotation angle of the vertex on the basis of the rotation angle of each joint obtained with the obtaining of the rotation angle and the weight predefined to the vertex corresponding to the joint and for moving the vertex according to the calculated rotation angle at every frame display period.

The video game apparatus, in accordance with the third aspect of the present invention, comprises a computer and a computer-readable recording medium recording a program to be executed with the computer. The program makes the computer execute obtaining the rotation angles of a plurality of joints in a virtual skeleton of the three-dimensional object constituted with the joints, with each vertex made to correspond to any one of the joints, on the basis of animation data defining the movement of the virtual skeleton at every frame display period, and calculating the rotation angle of the vertex on the basis of the rotation angle of each joint and the weight predefined for the vertex corresponding to the joint, and moving the vertex according to the rotation angle at every frame display period.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 shows an example list of vertex coordinates;

FIG. 3 shows an example list of normal vectors;

FIG. 4 shows an example list of triangular polygons;

FIG. 5 shows an example list of vertex groups;

FIG. 8 is an example table of joint data;

FIG. 9A is a first example table of animation data;

FIG. 9B is a second example table of animation data;

FIG. 14 is an example table of a matrix buffer;

FIG. 15 is an example table of a matrix cache;

DESCRIPTION OF THE PREFERRED EMBODIMENTS

Figure 1:
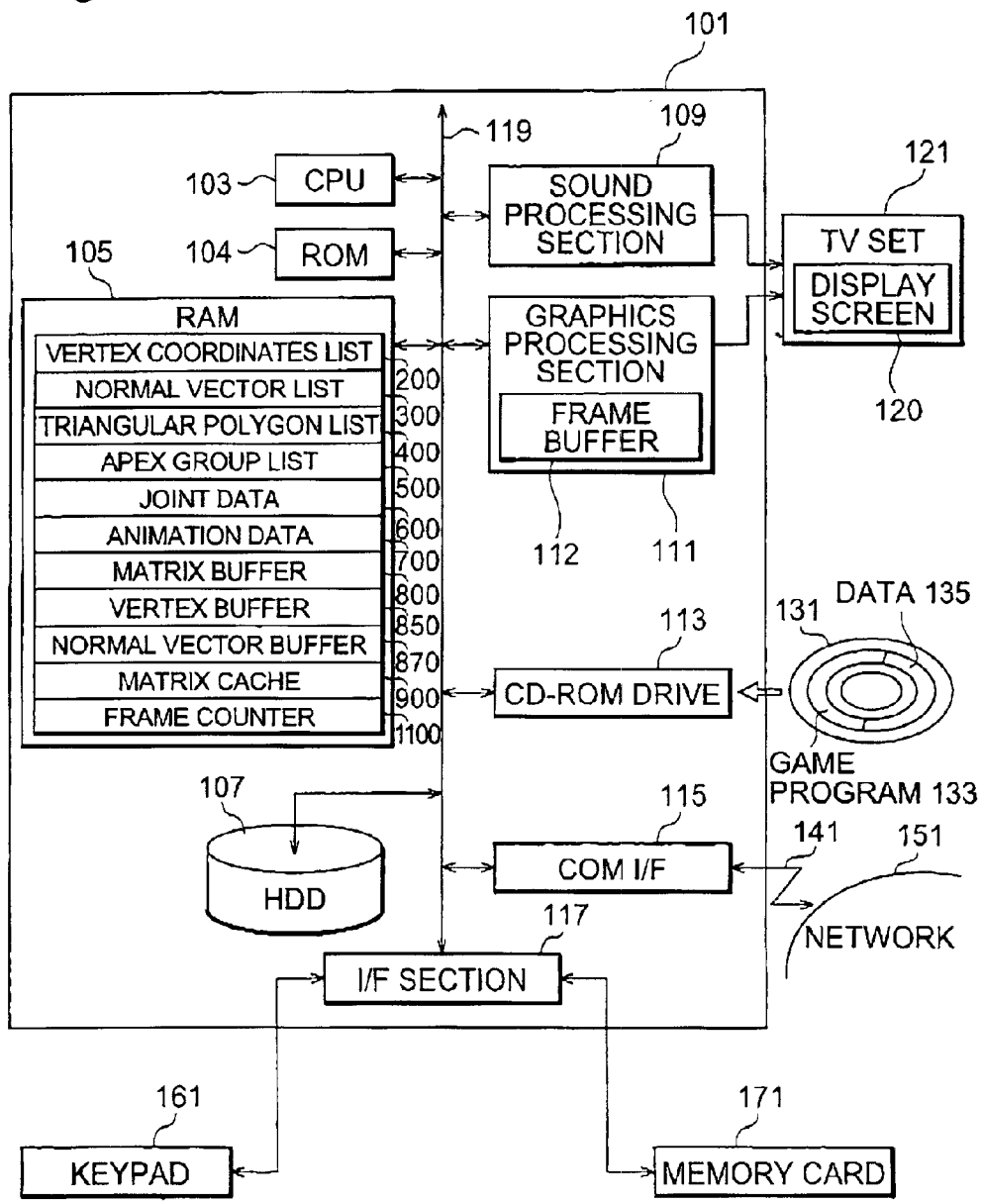
FIG. 1 shows a constitution of a home game apparatus.

FIG. 1 shows an example of a game apparatus 101 for home use for executing a computer program of an embodiment according to the invention. The home-use game apparatus 101 for example comprises; a CPU (central processing unit) 103 connected to an internal bus 119, a ROM (read-only memory) 104, a RAM (random access memory) 105, a HDD (hard disk drive) 107, a sound processing section 109, a graphics processing section 111, a CD-ROM drive 113, a communication interface 115, and an interface section 117. The graphics processing section 111 has a frame buffer 112.

The sound processing section 109 and the graphics processing section 111 of the home-use game apparatus 101 are connected to a TV set 121 having a display screen 120. A removable CD-ROM 131 is fit to the CD-ROM drive 113. On the CD-ROM 131 are recorded a game program 133 of the invention and data 135. The communication interface 115 is connected through a communication medium 141 to a network 151. To the interface section 117 are connected a keypad 161 having operation buttons and a memory card 171.

The CPU 103 executes the program stored on the ROM 104 and executes a game program 133 stored on the CD-ROM 131 to control the home game apparatus 101. The RAM 105 is a work area of the CPU 103. The HDD 107 is a memory region for storing for example the game program 133 and data 135 recorded on the CD-ROM 131. The memory card 171 is a memory region for storing data the game program 133 refers to. The sound processing section 109, when an instruction to output sound is issued from the program executed with the CPU 103, interprets the instruction and outputs sound signals to the TV set 121.

The graphics processing section 111 generates graphic data according to the picture producing instruction issued from the CPU 103, to write the data into the frame buffer 112. The graphic processing section 111 sends signals for displaying the written graphics data on a display screen 120 to the TV set 121. The CD-ROM drive 113 reads the game program 133 and the data 135 on the CD-ROM 131. The communication interface 115 is connected to the network 151 through the communication medium 141 and controls exchange of communication data with other computers.

Operation signals entered through the keypad 161 are sent through the interface 117 to the RAM 105. The CPU 103 interprets the input operation signals entered through the keypad 161 and executes calculating operations.

The game program 133 and the data 135 in the embodiment according to the present invention are stored first for example on the CD-ROM 131. The game program 133 and the data 135 are read with the CD-ROM drive 113 at the time of execution, and loaded to the RAM 105. The data 135 loaded to the RAM 105 are, as shown in FIG. 1, a list of vertex coordinates 200, a list of normal vectors 300, a list of triangular polygons 400, a list of vertex groups 500, cluster data 600, and animation data 700. The data storage media used in the course of processing the program related to present invention, include a matrix buffer 800, a vertex buffer 850, a normal vector buffer 870, a matrix cache 900, and a frame counter 1100, which will be described in detail below. The game program 133 and data 135 in the embodiment according to the present invention, which is stored in the CD-ROM 131, may be read out from the CD-ROM drive 113 in advance to be stored in the HDD 107. In the case the game program 133 and data 135 in the embodiment according to the present invention are stored in the HDD 107, the game program 133 and data 135 are loaded from the HDD 107 to the RAM 105.

The CPU 103 processes the game program 133 and data 135 of the invention, which have been loaded in the RAM 105 and issues the resultant signal, a picture producing instruction, to the graphics processing section 111. Intermediate data are stored in the RAM 105. The graphics processing section 111 works according to the picture producing instruction from the CPU 103, writes the graphics data to the frame buffer 112, and sends signals to be displayed on the display screen 120 to the TV set 121.

The program algorithm of the invention executed in the home game apparatus 101 as described above and the data for use will be described below.

Data for use in connection with the invention will be described in reference to FIGS. 2, 3, 4, 5, 6, 7, 8 and 9.

FIG. 2 shows the vertex coordinates list 200 of a three-dimensional object constituted with triangular polygons. The vertex coordinates list 200 includes a column 210 for vertex coordinate indexes and a column 220 for coordinates (x, y, z).

In FIG. 2, the coordinates of the vertex index vtx0 are (0, 0, 0), the coordinates of the vertex index vtx1 are (0, 0, 100), the coordinates of the vertex index vtx2 are (0, 100, 0), the coordinates of the vertex index vtx3 are (0, 100, 100), and the coordinates of the vertex index vtx4 are (100, 0, 0). The coordinates of the vertex in the vertex coordinates list 200 are relative position coordinates from corresponding joints in a virtual skeleton.

FIG. 3 shows a list 300 of normal vectors. The normal vector list 300 defines normal vectors at respective vertexes of each triangular polygon, and includes a column 310 for normal vector indexes and a column 320 for normal vectors (x, y, z).

In FIG. 3, the normal vector of the normal vector index nml 0 is (1, 0, 0), the normal vector of the normal vector index nml 1 is (−1, 0, 0), the normal vector of the normal vector index nml 2 is (0, 0, −1), the normal vector of the normal vector index nml 3 is (−1, −1, 0), and the normal vector of the normal vector index nml 4 is (0, −1, 0).

FIG. 4 shows a triangular polygon list 400 which stores vertex indexes and normal vector indexes of vertexes 0, 1 and 2 constituting each triangular polygon. The triangular polygon list 400 includes a column 410 for triangular polygon indexes, a column 420 for the vertex indexes and normal vector indexes constituting the vertex 0, a column 430 for the vertex indexes and normal vector indexes constituting the vertex 1, and a column 440 for the vertex indexes and normal vector indexes constituting the vertex 2.

In FIG. 4, the vertex 0 of the triangular polygon index plg0 is constituted with the vertex of the index vtx0 and the normal vector of the index nml 0, the vertex 1 of the triangular polygon index plg0 is constituted with the vertex of the index vtx1 and the normal vector of the index nml 2, and the vertex 2 of the triangular polygon index plg0 is constituted with the vertex of the index vtx2 and the normal vector of the index nml 3.

The vertex 0 of the triangular polygon index plg1 is constituted with the vertex of the index vtx0 and the normal vector of the index nml 1, the vertex 1 of the triangular polygon index plg1 is constituted with the vertex of the index vtx2 and the normal vector of the index nml 3, and the vertex 2 of the triangular polygon index plg1 is constituted with the vertex of the index vtx3 and the normal vector of the index nml 4.

Providing the vertex coordinates list 200 and the normal vector list 300, and separately providing the triangular polygon list 400 for storing the vertex indexes and normal vector indexes makes it possible to also use the same vertex coordinates data and the same normal vector data in the triangular polygon list 400. It also facilitates defining a separate normal vector for the same vertex. However, one normal can be made to correspond to only one vertex.

Vertexes that define the three-dimensional object are divided into groups. FIG. 5 shows a list 500 of groups of vertexes. In the vertex group list 500 are stored: the number of vertex groups, the number of vertexes (members) belonging to each of the vertex groups, each vertex index belonging to the vertex group, the weight predefined to each vertex, the number of normals defined to each vertex, and the normal index of each vertex. Therefore, the vertex group list 500 includes: the box 510 for the number of groups, boxes 520, 522 and 524 for the number of vertexes, boxes 530, 532, 534, 536, 550, 552, 554, 556 and 558 for the vertex indexes, boxes 540, 542, 544, 546, 560, 562, 564, 566 and 568 for the weights for vertexes, boxes 570, 572, 574, 576, 580, 582, 584, 586 and 588 for the number of normals, and boxes 591, 592, 593, 594, 595, 596, 597, 598 and 599 for the normal vector indexes. When the number of vertexes box appears, data for new vertex groups start. The vertex group numbers are given in order from the head data (data located higher in the Figure) in the vertex group list 500.

The number of groups box 510 in FIG. 5 shows that the number of groups is 3. The number of vertexes box 520 shows that the number of vertexes in the vertex group 0 is 4. In the box 530 for the vertex indexes belonging to the vertex group 0 is stored the vertex index vtx1. In the box 540 for the weight to the vertex index vtx1 is stored a weight 1.0. In the box 570 for the number of normals to the vertex index vtx0 is stored the value 2. In the box 591 for the normal vector indexes to the vertex index vtx1 are stored normal vector indexes nml 0 and nml 1.

In the box 532 for the vertex indexes belonging to the vertex group 0 is stored the vertex index vtx2. In the box 542 for the weight to the vertex index vtx2 is stored a weight 1.0. In the box 572 for the number of normals to the vertex index vtx2 is stored a value 1. In the box 592 for the normal vector indexes to the vertex index vtx2 is stored a normal vector index nml 10.

In the box 534 for the vertex indexes belonging to the vertex group 0 is stored an vertex index vtx3. In the box 544 for the weight to the vertex index vtx1 is stored a weight of 1.0. In the box 574 for the number of normals to the vertex index vtx3 is stored a value 1. In the box 593 for the normal vector indexes to the vertex index vtx3 is stored a normal vector index nml 2.

In the box 536 for the vertex indexes belonging to the vertex group 0 is stored the vertex index vtx4, in the box 546 for the weight to the vertex index vtx4 is stored a weight of 1.0, in the box 576 for the number of normals to the vertex index vtx4 is stored a value of 2, and in the box 594 for the normal vector indexes to the vertex index vtx4 are stored normal vector indexes nml 3 and nml 1.

The box 522 for the number of vertexes of the vertex group 1 shows that the number is 4. In the box 550 for the vertex indexes belonging to the group 1 is stored the vertex index vtx5, in the box 560 for the weight to the vertex index vtx5 is stored a weight 0.5, in the box 580 for the number of normals to the vertex index vtx5 is stored a value of 1, and in the box 595 for the normal vector indexes to the vertex index vtx5 is stored the normal vector index nml 11.

In the box 552 for the vertex index belonging to the vertex group 1 is stored an vertex index vtx6, in the box 562 for the weight to the vertex index vtx6 is stored a weight of 0.5, a value of 1 is stored in the box 582 for the number of normals to the vertex index vtx6, and in the box 596 for the normal vector indexes to the vertex index vtx6 are stored normal vector indexes nml 4.

In the box 554 for the vertex index belong to vertex group 1, a vertex index vtx7 is stored. In the box 564 for the weight to the vertex index vtx7, a weight of 1.0 is stored. In the box 584 for the number of normals to the vertex index vtx7, the value of 1 is stored. In the box 597 for the normal vector index to the vertex index vtx7, the normal vector index nml 5 is stored.

In the box 556 for vertex index belong to vertex group 1, a vertex index vtx8 is stored. In the box 566 for weight to the vertex index vtx8, a weight of 1.0 is stored. In the box 586 for the number of normals to the vertex index vtx8, the value of 3 is stored. In the box 598 for the normal vector index to the vertex index vtx8, the normal vector index nml 6, nml 8 and nml 9 are stored.

The box 524 for the number of vertexes of the vertex group 2 shows that the number is 1. In the box 558 for the vertex indexes belonging to the vertex group 2 is stored a vertex index vtx7, in the box 568 for the weight to the vertex index vtx7 is stored a weight 0.5, in the box 588 for the number of normals to the vertex index vtx7 is stored a value of 1, and in the box 599 for the normal vector indexes to the vertex index vtx7 is stored normal vector indexes nml 7.

In this embodiment, the weight value is a real number between 0 and 1 and any vertex belongs to one group of vertexes.

Figure 6:
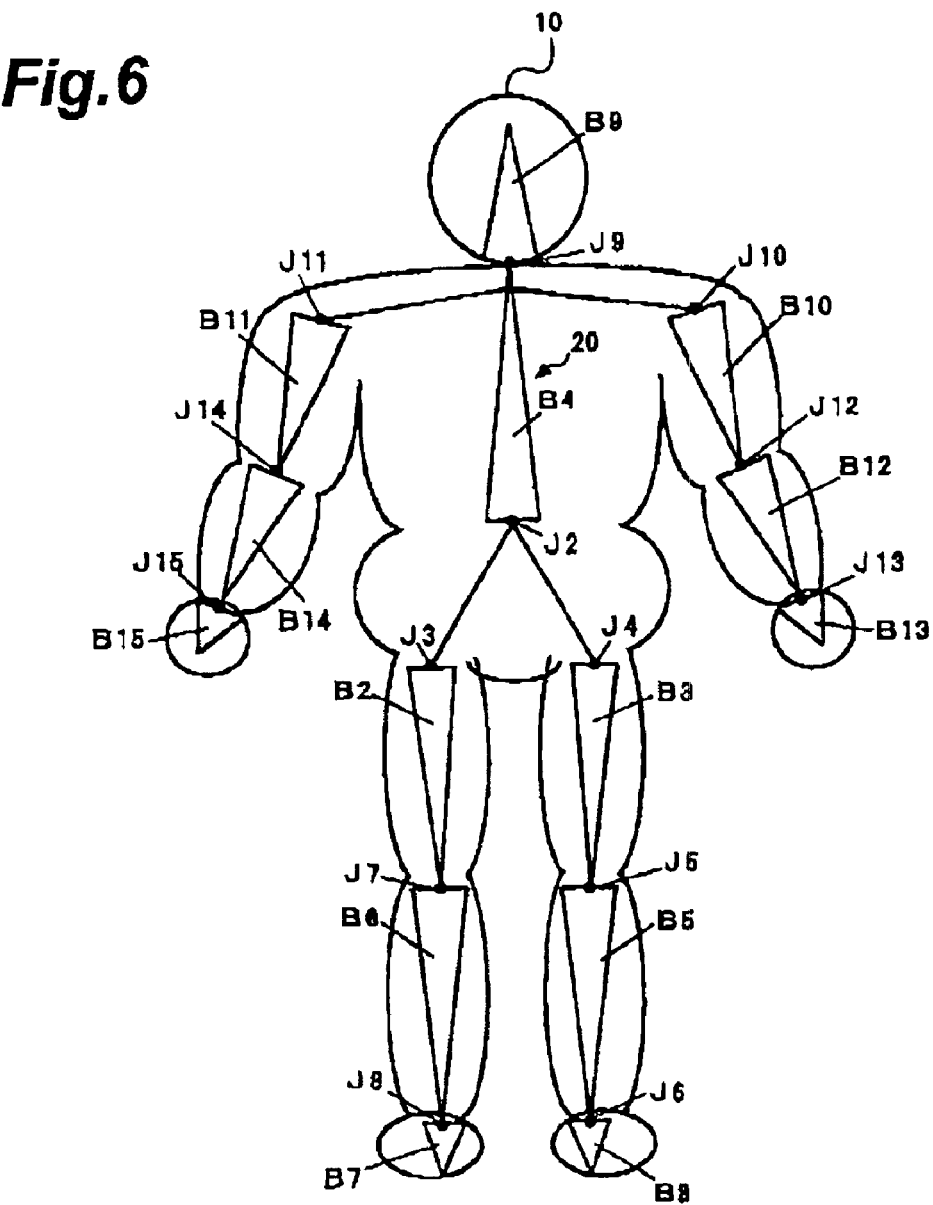
FIG. 6 is a sample of a schematic drawing showing a three-dimensional object and a virtual skeleton.

FIG. 6 shows a front view of an example of a virtual skeleton of a human shaped three-dimensional object 10. The virtual skeleton 20 corresponding to the human shaped three-dimensional object 10 includes a root joint J2, joints J3, J4, J5, J6, J7, J8, J9, J10, J11, J12, J13, J14 and J15, a root bone B2, and bones B3, B4, B5, B6, B7, B8, B9, B10, B11, B12, B13, B14 and B15.

The relationships are as follows: The bone B3 is imagined to be between the joints J4 and J5. The bone B5 is imagined to be between the joints J5 and J6. The bone B8 is imagined to be joined to the joint J6. The root bone B2 is imagined to be between the joints J3 and J7. The bone B6 is imagined to be between the joints J7 and J8. The bone B7 is imagined to be joined to the joint J8.

The bone B4 is imagined to be between the joints J2 and J9. The bone B9 is imagined to be joined to the joint J9. The bone B11 is imagined to be between the joints J11 and J14. The bone B14 is imagined to be between the joints J14 and J15. The bone B15 is imagined to be joined to the joint J15 The bone B10 is imagined to be between the joints J10 and J12. The bone B12 is imagined to be between the joints J12 and J13. The bone B13 is imagined to be joined to the joint J13.

The virtual skeleton 20 is literally virtual and is not displayed on the display screen 120. Although the three-dimensional object 10 is human-shaped, it is provided with joints that do not exist in a real human. The bones are also imaginary.

Although the bones are shown in FIG. 6, they are merely shown to facilitate understanding of the virtual skeleton 20. Therefore, the virtual skeleton 20 has no bone data. That is why the word "imagined" is used in the above description.

Figure 7:
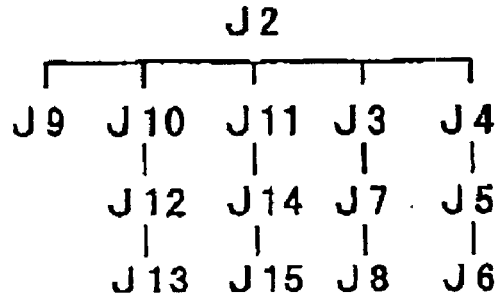
FIG. 7 is a schematic diagram showing the rank structure of joints in the virtual skeleton in FIG. 6.

The joints are constituted in layers. The joints in the example shown in FIG. 6 are constituted in layers as shown in FIG. 7. The root joint J2 is located at the root of the hip and belongs to the uppermost layer. The child joints of the root joint 2 are; the joint J3 at the root of the right leg, the joint J4 at the root of the left leg, the joint J9 at the root of the neck, the joint J10 at the root of the left arm, and the joint J11 at the root of the right arm. Since the joint J3 is the one at the root of the right leg of the three-dimensional object 10, the child joint of the joint J3 is the joint J7, the right knee joint of the three-dimensional object 10. The child joint of the joint J7 is the joint J8, the right ankle joint of the three-dimensional object 10.

The joint J4 is at the root of the left leg of the three-dimensional object 10. Therefore, the child joint of the joint J4 is the joint J5, the left knee joint of the three-dimensional object 10. The child joint of the joint J5 is the joint J6, the left ankle joint of the three-dimensional object 10.

The joint J10 is at the root of the left arm of the three-dimensional object 10. Therefore, the child joint of the joint J10 is the joint J12, the left elbow joint of the three-dimensional object 10. The child joint of the joint J12 is the joint J13, the left knuckle joint of the three-dimensional object 10.

The joint J11 is at the root of the right arm of the three-dimensional object 10. Therefore, the child joint of the joint J11 is the right elbow joint J14 of the three-dimensional object 10. The child joint of the joint J14 is the joint J15, the right knuckle joint.

As shown in FIG. 7, every joint, except for the root joint J2, is always made to correspond to a parent joint. A plurality of child joints may be made to correspond to one parent joint and a joint having no end is not made to correspond with a child joint.

Each vertex corresponding to each joint moves according to the amount of change allotted to each joint. At the same time, the child joint of each joint also moves. For example, when the root joint J2 makes a parallel movement, all the joints lower in rank than the root joint J2, namely the entire virtual skeleton 20 makes a parallel movement. Accordingly, the corresponding three-dimensional object 10 as a whole makes a parallel movement. Since the movement of the root joint J2 affects all the joints, the root joint J2 may be used for positional arrangement of the three-dimensional object 10.

In this embodiment, the virtual skeleton as described above is used. Joint data 600 are prepared as shown in FIG. 8 for the joints of the virtual skeleton. The joint data 600 includes for every joint data for the joint and data for the vertex group corresponding to the joint. The joint data also includes data related to the joint layer structure.

In the joint data 600, the joint index of the root joint is stored in the root index box 610. In the example of FIG. 8, the joint index is "root." In the box 612 of the reference parallel movement amount (x, y, z) of the root joint is stored the position to be the reference of the root joint in the reference attitude of the virtual skeleton. In the example of FIG. 9, the position is (0, 0, 0). In the box 614 for the reference rotation angle (Rx, Ry, Rz) of the root joint is stored the rotation angle to be used as the reference of the root joint. In the example of FIG. 8, it is (0, 0, 90). In the box 616 for the number of joints is stored the number of joints belonging to the layer below that of the root joint. In the example of FIG. 8, it is 4.

In the box 620 for the joint index is stored a joint index joint0 belonging to a layer below that of the root joint. In the box 622 for the parent index is stored the joint index "root" of the parent joint of the joint "joint0." In the box 624 for the reference parallel movement amount are stored relative coordinates (90, 20, 0) to be used as the reference from the parent joint "root" of the joint "joint0" in the reference attitude of the virtual skeleton. In the box 626 for the reference rotation angle are stored relative rotation angles (0, 0, 135) to be used as the reference from the parent joint of the joint "joint0" in the reference attitude of the virtual skeleton.

In the box 628 for the number of vertex groups is stored the number of vertex groups corresponding to the joint "joint0." In the example of FIG. 8, it is 2. In the boxes 630 and 632 for the vertex group numbers are stored vertex group numbers in the vertex group list 500 corresponding concretely to the joint "joint0." In the example of FIG. 8, they are the vertex group 0 and the vertex group 2.

In the box 640 for the joint index are stored joint indexes of the joints belonging to the virtual skeleton other than the root joint "root" and the joint "joint0." In the example of FIG. 8, it is the joint index "joint1." In the parent index box 642 for storing the index of the parent joint of the joint "joint1" is stored the joint index "joint0."

In the box 644 for the reference parallel movement amount are stored relative coordinates (40, 0, 0) to be used as the reference from the parent joint 'joint0' of the joint 'joint0' in the reference attitude of the virtual skeleton. In the box 646 for the reference rotation angle are stored relative rotation angles (0, 0, 45) to be used as the reference from the parent joint "joint1" of the joint "joint1" in the reference attitude of the virtual skeleton.

In the box 648 for the number of vertex groups is stored the number of vertex groups corresponding to the joint "joint1." In the example of FIG. 8, it is 1. In the box 650 for the vertex group number is stored the vertex group number in the vertex group list 500 corresponding concretely to the joint "joint1." In the example of FIG. 8, it is the vertex group 1.

The operations to the joints of the virtual skeleton for transforming is made according to animation data 700 shown in FIGS. 9A and 9B. The data include the animation data 700A (FIG. 9A) for defining the number of clusters and the number of frames, and animation data 700B (FIG. 9B) for defining the rotation angle of each cluster which moves at every frame display period from the start to the end of transformation. In the animation data 700B, joints are arranged in order from the root joint to the lowest layer.

In FIG. 9A, the number of joints to be moved is stored in the box 710. In the example of FIG. 9A, the number of joints is 2. The number of time frames from the start to the end of transformation is stored in the box 720. In the example of FIG. 9A, the number of frames is 10. In the following, the rotation angles of the joints of the frame display period are specified in the animation data 700B (FIG. 9B) at every two lines corresponding to the number "Z" of the joints to be moved. In the box 730 for the joint index is stored the index of the joint to be moved. In the box 740 for the rotation angles (Rx, Ry, Rz) are stored the angles of rotation from the reference attitude.

In the frame 0, the rotation angles of the joint "joint0" to be moved are (0, 0, 0). The rotation angles of the joint "joint1" to be moved are also (0, 0, 0). This means that it remains in the reference attitude. Next, in the frame 1, the rotation angles of the joint "joint0" are (10, 0, 135). The rotation angles of the joint "joint1" are (−10, 5, 45). Data like these follow down to the frame 9. In the frame 9, the rotation angles of the joint "joint0" are (90, 0, 150). The rotation angles of the joint "joint1" are (−90, 45, 45).

In this embodiment, the rotation angle has three parameters, Rx, Ry, Rz. The angle RX denotes the rotation angle about the x axis passing through the joint. The angle Ry denotes the rotation angle about the y axis passing through the joint. The angle Rz denotes the rotation angle about the z axis passing through the joint. While the rotation here is assumed to be made in the order of x, y, and z, it may be made in any order. However, a different order of rotation results in a different position after the rotation. Therefore, it is necessary that the order of rotation at the time of creating data is the same as that at the time of transforming the virtual skeleton.

The data described above are used in this embodiment. Before describing the program processing in this embodiment, the principle of the operation will be described with reference to FIGS. 10A, 10B, 10c, and 10D. The operation of a right arm of a virtual skeleton shown In FIG. 6 will be explained hereinafter.

Figure 10A:
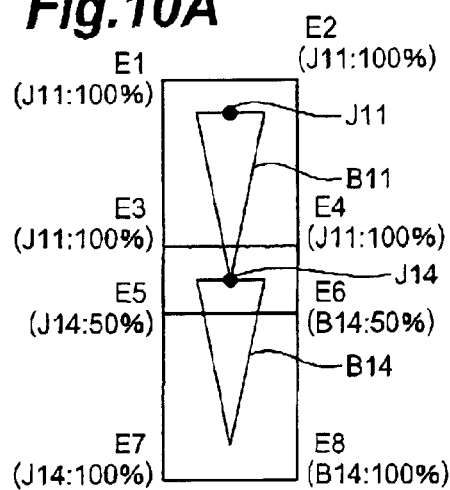
FIG. 10A is a schematic drawing of a two-dimensional virtual skeleton in the state of a joint not rotated yet.

FIG. 10A shows a two-dimensional virtual skeleton in the state before transformation. The right arm of the virtual skeleton is constituted with joints J11 and J14 and bones B11 and B14.

Beside, in this embodiment, joint0 is assigned to a joint index of joints J11 and joint 1 is assigned to a joint index of Joint J14. In FIGS. 10A, 10B, 10C and 10D, a parent joint of Joint J11 and a child joint of Joint J14 are omitted.

The vertex group 0 and the vertex group 2 correspond to Joint J11 (Joint index joint0) (See FIG. 8). The operation example will be explained by paying attention to the vertex group 0. Four vertexes vtx1, vtx2, vtx3 and vtx4 are included in the vertex group 0 (See FIG. 5). The each of the four vertexes vtx1, vtx2, vtx3 and vtx4 is 1.0 (100%). In FIG. 10A, the positions of four vertexes vtx1, vtx2, vtx3 and vtx4 are indicated as E1, E2, E3 and E4 respectively.

While, the vertex group 1 corresponds to Joint J14 (Joint index joint1) (See FIG. 8). Four vertexes vtx5, vtx6, vtx7 and vtx8 are included in the vertex group 1 (See FIG. 5). The weights of vertexes vtx5 and vtx6 are 0.5 (50%) and the weights of vtx7 and vtx8 are 1.0 (100%). In FIG. 10A, the positions of four vertexes vtx5, vtx6. vtx7 and vtx8 are indicated as E5, E6, E7 and E8 respectively.

Besides, in FIG. 10A, designations of joints corresponding to the vertexes and weights of the vertexes are shown in the lower portion of the characters denoting the positions E1, E2, E3, E5, E6, E7 and E8 of the vertexes.

Figure 10B:
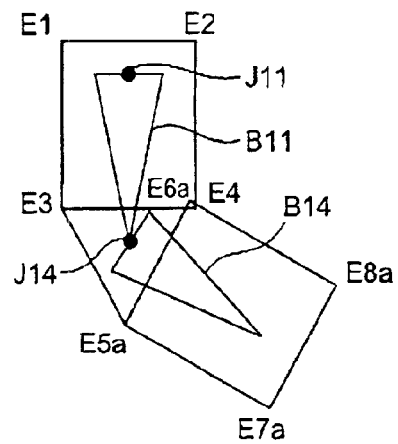
FIG. 10B is a schematic drawing in the state of the joint rotated with all the vertexes weighted with 100%.

FIG. 10B shows the virtual skeleton with its joint J14 rotated through 60 degrees. However, unlike in FIG. 10A, the vertexes vtx5 and vtx6 at the positions V5 and V6 have a weight of 100% rather than 50%. In this case, each of the vertexes corresponding to joint J14 moves with the rotation of joint J14. For example, vertex8 moves to the position E8a. As shown in FIG. 10B, it is seen that the position E8a of vertex6 ends up lying inside the three dimensional object. In such a way the three-dimensional object cannot be displayed in a smooth shape.

Figure 10C:
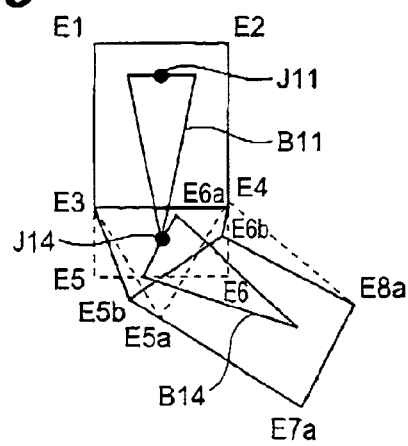
FIG. 10C is a schematic drawing in the state of the joint rotated with the technique described in the Japanese Patent Laid-open Publication No. Hei-10-74270.

FIG. 10C shows a case transformed by a method disclosed in Japanese Patent Laid-open Publication No. Hei-10 74270 referred to in the Related Background Art. In this case, the influence rate of the positions V5 and V6 of each of vertexes vtx5 and vtx6 to joint J11 is 50% and to joint J14 is 100%. FIG. 10C shows the positions E5 and E6 of vertexes vtx5 and vtx6 after transformation where both of the influence rates of the vertexes vtx5 and vtx6 to Joint 11 is 100%. Further, FIG. 10C shows the positions E5a and E6a of the vertexes after transformation in the case that both of the influence rates of the vertexes vxt5 and vxt6 to joint 11 is 100%. In FIG. 10C, lines connecting between positions of each vertexes prior to and after transformation are shown as a dotted lines in the case that both influence rates of vertexes vtx5 and vtx6 to joint J14 is 100%.

In the technique described in Japanese Patent laid-Open Publication No. Hei-10 74270, the position coordinates of V5 and V5a are interpolated with rates of influence on the joints A and B to obtain the position E5b of vertex vtx5. The position coordinates of V6 and V6a are also interpolated with rates of influence on the joints J11 and J14 to obtain the position E6b of vertex vtx6. The vertex positions E5b and E6b obtained by interpolation are the positions of vertexes V5 and V6 after the transformation.

As described in the Related Background Art, if the parent joint, the joint A, of the joint B does not move, the positions E5 and E6 coordinates themselves may be used in the incorporation process. However, the joint A may actually move. In this case, the positions of vertexes vtx5 and vtx6 after the movement of joint 11, the positions of vertex vtx5 and vtx6 after the rotation of joint J14 should be calculated by a vertex conversion process. In this case, the vertex conversion must be made twice to obtain the positions of VS and V6, and to obtain the positions of V5a and V6a.

In this embodiment as shown in FIG. 10A, only one weight for one joint J14 is defined to correspond to the vertex vtx5 in the position E6 and the vertex vtx6 in the position E6. In the example of FIG. 10A, both of the weights to the vertexes vtx5 and vtx6 is 50%. In the case that the weight is 0.5 and the rotation angle of joint J14 is 60 degree, in this embodiment, positions of vertexes vtx5 and vtx6 are calculated when joint 14 is rotated by 30 degrees. The calculated positions of vertexvtx5 and vtx6 are matched with positions at which vertexes vtx5 and vtx6 receive 100% influence (weight 100%) by joint J14 rotated by 30 degrees. The calculated positions are made vertexes vtx5 and vtx6 after transformation.

Figure 10D:
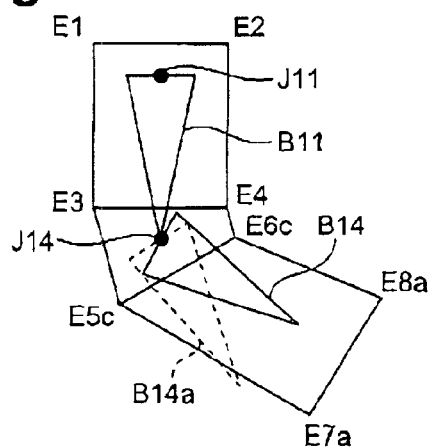
FIG. 10D is a schematic drawing in the state of the joint rotated by the use of present invention.

In FIG. 10D, the bone B14 shown with broken lines is the state after being rotated by 30 degrees. The positions of vertexes vtx5 and vtx6 when the bone B14 is rotated by 30 degrees and where vertexes vtx5 and vtx6 are affected by joint J14 by 100% (weight 100%), are E5c and E6c respectively. On one hand, the positions of vertexes vtx7 and vtx8 of which weights to joint J14 are 1.0 (100%), are E7a and E8a. These positions E7a and E8a correspond to positions when the bone B14 is rotated by 60 degrees. As shown in FIG. 10D, in the application of the process according to the present embodiment, the position E6c of vertex6 does not dive inside the three-dimensional object and therefore the three-dimensional object after transformation is smooth.

Since the direction of rotation in FIGS. 10A, 10B, 10C and 10D is limited to that about a single axis, the rotation angle corresponding to the weight is obtained easily. Thus, where rotation is made in a three-dimensional space, attention should be paid to the points set forth below.

Counter-clockwise direction of each axis in a positive direction of the axis is assigned to the rotation around each axis as a positive rotational direction in the following explanation. For example, the conversion of rotating in the order of 0 degree about the x-axis, 0 degree about the y-axis, and 90 degrees about the z-axis is completely the same as the conversion of rotating in the order of 180 degree about the x-axis, 180 degree about the y-axis, and −90 degrees about the z-axis. The rotary conversion matrix is also the same.

However, simple changes in the angle of each axis according to the weight due to the vertex of a weight of 50% leads to an undesirable result. That is to say, the former becomes the conversion of rotating in the order of 0 degree about the x-axis, 0 degree about the y-axis, and 45 degrees about the z-axis. The latter becomes the conversion of rotating in the order of 90 degree about the x-axis, 90 degree about the y-axis, and −45 degrees about the z-axis. Although the two produce the same conversion before the change, they become completely different after the change.

Therefore in this embodiment, reflection of the weight is made by the use of a quarternion and sphere-linear interpolation. A brief description of the quarternion and sphere-linear interpolation will be given below.

A quarternion is also known as a four element number and expressed by a combination of vectors and a scalar values. For example, a quarternion $q=a+bi+cj+dk$, where a, b, c, and d are scalar values, and i, j, and k are unit vectors. An expression such as $q=(b, c, d, a)=q(V, a)$ is also used where Vector $V=(b, c, d)$. A quarternion can express a rotation around a rotary axis after defining the rotary axis.

It is assumed that i represents the x axis, j the y axis, and k the z axis. The quarternion when rotating by Rx turns about the x axis is $qx=(\sin(Rx/2), 0, 0, \cos(Rx/2))$. The quarternion when rotating by Ry turns about the y axis is $qy=(0, \sin(Ry/2), 0, \cos(Ry/2))$. The quarternion when rotating by Rz turns about the z axis is $qz=(0, 0, \sin(RZ/2), \cos(RZ/2))$. The quarternion of rotating in the order of x axis, y axis, and z axis is obtained with $grot=gx*qy*qz$ (The sign * denotes multiplication of quarternions). The sign grot represents a rotary axis and rotation angle for obtaining the same result by a single rotation as the result obtained by rotating in the order of x axis, y axis, and z axis. However, mutual multiplication of quarternions becomes as follows. The sign "X" denotes an outer product and the sign "·" an inner product:

[Equation 1]

$$q1*q2 = (V1, w1)*(V2, w2) \qquad (1)$$
$$= (V2*w1 + V1*w2 + V1 \times V2, \; w1*w2 - V1 \cdot V2)$$

Figure 11:
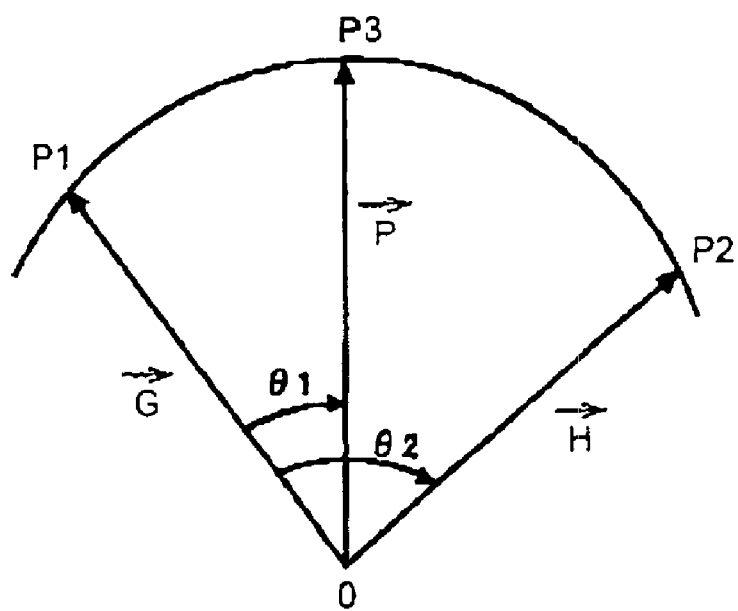
FIG. 11 is a schematic drawing for explaining the sphere-linear interpolation.

The sphere-linear interpolation may be easily understood by considering a situation as shown in FIG. 11. In FIG. 11, points P1, P2 and P3 are on an arc whose center is a point O. It is assumed that a vector G is a vector from the point O to a point P1, a vector H is a vector from the point O to a point P2, and a vector P is a vector from the point O to a point P3, and further it is assumed that the angle between the vectors G and H is θ2, the angle between the vectors G and P is θ1, and the vector P is sought. It can be written as $P=\alpha G+\beta H$ ($\alpha$ and $\beta$ are real numbers). Since $|P|=1$, $G\cdot H=\cos\theta 2$, and $G\cdot P=\cos\theta 1$, P is obtained from the equation below:

[Equation 2]

$$P=(G\sin(\theta 2-\theta 1)+H\sin\theta 1)/\sin\theta 2 \qquad (2)$$

If it is assumed that $\theta 1=\theta 2 u$ (u is [0,1]), it becomes as follows:

[Equation 3]

$$P=(G\sin(1-u)\theta 2+H\sin(\theta 2u))/\sin\theta 2 \qquad (3)$$

The same operation is applicable to the quarternion. When a quarternions $q0=(V0, w0)$ and $q1=(V1, w1)$ are sphere-linear interpolated with t (belonging to [0, 1]), the resultant quarternion becomes as follows:

[Equation 4]

$$q=(q0*\sin((1-t)\omega)+q1*\sin(t*\omega))/\sin\omega \qquad (4)$$
$$\omega=a\cos(w0*w1+V0\cdot V1)$$

The designation (t*ω) denotes a scalar product of t and ω, and the designation a cos denotes arc-cosine.

To obtain the movement destination position E5C and E6C of the vertexes Vtx6 and Vtx6 shown in FIG. 10D in this embodiment, sphere-linear interpolation is applied to the unit quarternion $qi=(0, 0, 0, 1)$ and the quarternion corresponding to the rotation made to the joint J14. It is also possible to simplify as $q2=qi$, and calculate with $q=(1-t)q1+qi*t$.

The rotary conversion matrix based on the quarternion $q=(x, y, z, w)$ obtained from the above calculation is as follows.

[Equation 5]

$$R = \begin{pmatrix} 1-2*(y*y+z*z) & 2*(x*y-w*z) & 2*(x*z+w*y) & 0 \\ 2*(x*y+w*z) & 1-2*(x*x+z*z) & 2*(y*z-w*x) & 0 \\ 2*(x*z-w*y) & 2*(y*z+w*x) & 1-2*(x*x+y*y) & 0 \\ 0 & 0 & 0 & 1 \end{pmatrix} \quad (5)$$

The sign * in the equation (5) denotes a scalar product.

For the details of the quarternion and the sphere-linear interpolation, refer to *Advanced Animation and Rendering Techniques Theory and Practice* (Alan Watt and Mark Watt, ADDI SON-WESLEY ISBN 0-201-54412-1, p360–p368).

Creating the vertex conversion matrix using the quarternion and the sphere-linear interpolation is like performing the process of (a) obtaining a rotation axis determined from the rotation angle (Rx, Ry, Rz) of the joint and the rotation angle corresponding to the rotation axis, (b) further changing the rotation angle according to the weight predefined to the vertex corresponding to the joint, and (c) rotating about the corresponding rotary axis by the changed rotation angle. Although there are many methods to obtain the same resultant rotation, use of the quarternion and the sphere-linear interpolation is the shortest way to make the intended rotation.

On the basis of the above assumption, the flow of process of this embodiment will be hereinafter described.

At the time of start-up, the CPU 103 reads the game program 133 and the data 135 necessary for the execution of graphics processing and playing games from the CD-ROM 131 through the CD-ROM drive 113 on the basis of the operating system stored in the ROM 104, and transfers them to the RAM 105. The CPU 103 performs the processes described below by executing the game program 133 transferred to the RAM 105.

By the way, some of the controls and processes performed with the home use game apparatuses 101 are actually performed with the CPU 103 in cooperation with circuits other than the CPU 103. For the convenience of description, the operation of the CPU 103 will be mainly explained.

The game program 133 and the data 135 necessary for the execution of graphics processing and playing games from the CD-ROM 131 are actually read according to the instructions from the CPU 103 and as the process progresses are transferred to the RAM 105 in succession. However, in the description below, the description of reading the data from the CD-ROM 131 and transferring to the RAM 105 is omitted to facilitate understanding the invention.

If the game program 133 and the data 135 necessary for the execution of graphics processing and playing games are stored in the HDD 107, they are read, according to the instruction of the CPU 103, from the HDD 107 and transferred to the RAM 105 in succession. However, for clarity purposes as mentioned above, the description of reading the data from the HDD 107 and transferring to the RAM 105 is omitted.

Figure 12:
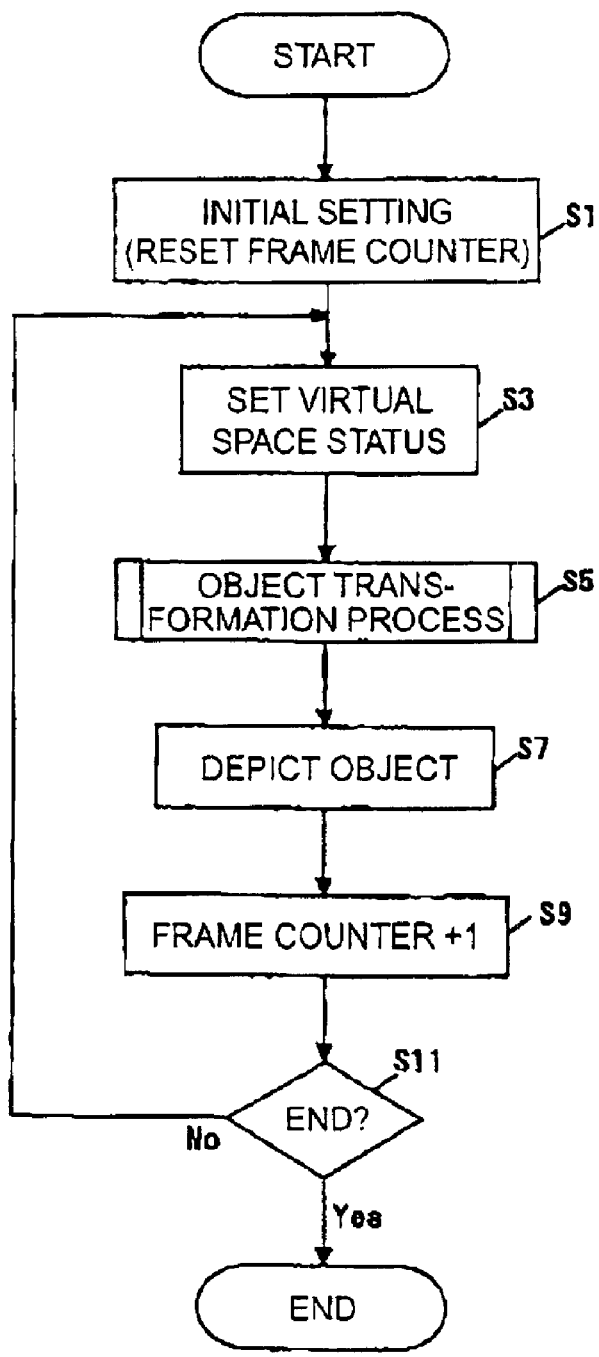
FIG. 12 shows a main flow chart of a process of present invention.

FIG. 12 shows a main flow of this embodiment. At first, an initial setting is made (step S1). In this initial setting, the data as shown in FIGS. 2 to 5, 8, and 9 are read and loades in the RAM 105. A frame counter is reset to zero. Then the status of the virtual space is set (step S3). The virtual space status setting includes for example; giving an instruction to start the animation of a three-dimensional object by the keypad 161 operation by the operator, and in the case a viewpoint position is changed also by the keypad 161 operation by the operator, changing the status in the virtual space accordingly.

Then, the object is transformed according to the invention (step S5). This will be elaborated on later. A picture producing process is applied to the changed three-dimensional object (step S7). Light source calculation and see-through conversion are made and pictures are produced in the frame buffer 112. The picture producing process of this embodiment is the same as that of the prior art. Then a frame counter 1100 is given an increment of 1 (step S9). Whether the process is over is determined (step S11). If the end of the process is shown with the value of the frame counter 1100, the process is finished. If not, the process goes back to the step S3.

Figure 13:
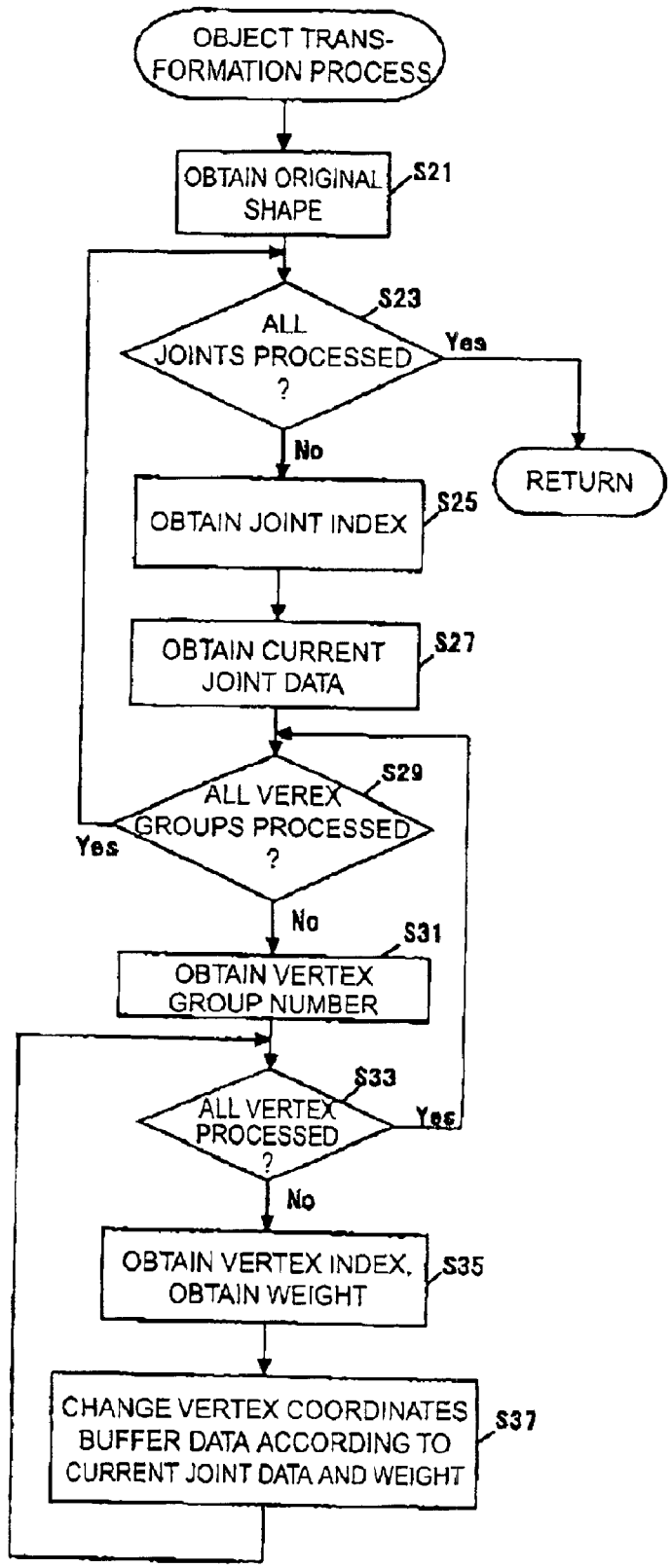
FIG. 13 is a flowchart of a process of transforming a three-dimensional object according to the invention.

Details of the object transformation process are shown in FIG. 13. As seen from the explanation of FIG. 12, the frame number is known before transforming the object. At first, the original shape of the three-dimensional object is acquired (step S21). Here, the vertex coordinates list 200 copied to the RAM 105 is copied to create a vertex buffer 850 in the RAM 105. Whether the transformation process is applied to all the joints is determined (step S23). If the transformation process is applied to all the joints, the process goes to the step S7 of FIG. 12. If the transformation process is not finished for all the joints, the process goes to the step S25.

In the step S25, a joint index is obtained from the animation data 700. Current joint data related to the obtained joint index are obtained (step S27). The current joint data here means the rotation angles (Rx, Ry, Rz) of the joint. As already explained for the animation data 700, it is arranged that a rotary angle of the joint is obtained in order from those in higher layers. That is to say, for the joints in higher layers than the joint in the transformation process, the process is performed in a step prior to that of the joint. Therefore, the joints in higher layers are arranged in upper places in the animation data 700.

Next, it is determined whether the movement process is completed for all the vertex groups corresponding to the acquired joint index (step S29). If the movement process for all the vertex groups corresponding to the acquired joint index is completed, the process returns to the step S23 to move on to the next process for the next joint index. On the other hand, if the movement process is not finished for all the vertex groups corresponding to the acquired joint index, an unprocessed vertex group number is acquired from the joint data 600 (step S31).

Next, while using the vertex group list 500 for reference, whether the movement process is finished for all the vertexes belonging to the acquired vertex group number is determined (step S33). The vertex group list 500 does not include data of the vertex group number. However, the vertex group number can be made known from the number of appearances of the lines 520 to 524 of the vertex number (member number) as the vertex group list 500 is scanned from above. That is to say, the number of appearances of the lines 520 to 524 of the vertex number minus 1 is the vertex group number. Therefore, the vertex data related to the obtained vertex group number can be obtained by scanning the vertex group list 500 from above until the number of appearances of the lines 520 to 524 of the vertex number minus 1 becomes the obtained vertex group number.

If the movement process is finished for all the vertexes belonging to the obtained vertex group number, the process returns to the step S29. If the movement process is not finished for all the vertexes belonging to the obtained vertex group number, vertex indexes yet to be processed are obtained from the vertex group list 500 and also the weights w (w is not less than 0 and not more than 1) for the vertexes are obtained from the vertex group list 500 (step S35).

The coordinates data of the vertex buffer are changed on the basis of current joint data (rotation angle in the current frame) and the weight w (step S37). In the step S37, sphere-linear interpolation is applied to the above-described quarternion. That is to say, the quarternion q1 by the rotation angle of the joint in the current frame and the unit quarternion gi are interpolated with the weight w. From the quarternion g obtained by the sphere-linear interpolation, a conversion matrix R in the joint is obtained with the above equation (5).

An overall matrix for obtaining from the original vertex coordinates v the vertex coordinates va after rotation due to the joint rotation becomes M=MJTB using a matrix J representing relative coordinates from a parent joint, a matrix T representing a reference rotation angle, and a conversion matrix B of the parent joint. That is to say, the vertex coordinates va to be finally obtained are obtained from the equation below:

Equation 6

$$va = vM \qquad (6)$$

The calculated coordinates va=(xa, ya, za) are written to an vertex buffer 850. The normal vector of the vertex is taken out of the normal vector list 300, converted using the rotary component only of the conversion matrix M into a vector, and written to a normal vector buffer 870. As a result, the coordinates of the vertex and the normal vector value are renewed. The renewed coordinates of the vertex and the normal vector value are respectively stored in the vertex buffer 850 and the normal vector buffer 870, and the picture of the three-dimensional object is produced in the frame buffer 112 according to the contents in the vertex buffer 850 and the normal vector buffer 870.

After the step S37, the process returns to the step S33, and the steps S35 and S37 are executed until the movement process is finished for all the vertexes in the vertex group.

The process of step S37 using the matrix M is an approximation means for executing the process in real time. A more accurate normal vector can be obtained by creating the normal vector in consideration of information such as edge data (an angle formed with a neighboring polygon).

In the process of the above step S37, the conversion matrix M is calculated for every vertex. However, it is not necessary to calculated the conversion matrix M for every vertex. In the case of an vertex corresponding to the same joint, a conversion matrix M previously calculated as it is may be used if the same weight is predefined to the vertex. The cache of the conversion matrix M and the buffer of the conversion matrix B will be described below.

FIG. 14 shows the matrix buffer 800 of the conversion matrix B of the parent joint. In each time frame in the animation data 700, processing is made in order from the root joint to the joint in the lowermost layer. Since every joint except for the root joint is affected with a parent joint, the conversion matrix B of a weight of 100% of the parent joint is necessary. Also at the time of processing a vertex corresponding to a parent joint, the conversion matrix B as it is can be used if the weight of the vertex corresponding to the parent joint is 100%.

Therefore, in the matrix buffer 800, data of the conversion matrix at the weight of 100% are stored for each joint. In the box 810, for the joint indexes, are stored joint indexes below the root joint. In the box 820, for the matrix data, data of conversion matrixes of respective joints are stored. In the above, it is M=RJTB. Basically, the same equation may be used for calculation. Here are assumed a conversion matrix Ra obtained without using a quarternion with a weight f 100% and a conversion matrix Ba of a weight of 100% of a parent joint of a further parent joint. The conversion matrix B to be obtained is B=RaJTBa.

Two types of embodiments of the cache of the conversion matrix M will be shown here. FIG. 15 shows a matrix cache 900 provided with a box 910 for storing vertex weight value calculated immediately before and a box 920 for the conversion matrix M corresponding to the weight. If a plural number of vertexes having the same weight exist for the same joint, a conversion matrix M once calculated may be used again.

Therefore, if a new vertex is processed for movement (FIG. 13: step S37), first the matrix cache 900 is used for reference. A determination is made whether the weight value of the new vertex is in agreement with the weight value stored in the weight box 910 of the matrix cache 900. If in agreement, the data of the conversion matrix M stored in the box 920 of the conversion matrix M may be used for the new vertex. Therefore, the vertex is moved with the conversion matrix M read out of the matrix cache 900. On the other hand, if the weight value of the new vertex is not in agreement with the weight value stored in the weight box 910 of the matrix cache 900, a new conversion matrix M is calculated in the same manner as described above. The new vertex weight and the calculated conversion matrix M are stored in the matrix cache 900.

This technique is effective on condition that the vertex indexes are sorted by the vertex weight data for each joint or for each vertex group. The vertex group list 500 of FIG. 5 shows the manner of the vertex indexes being sorted by the vertex weight data.

In FIG. 15, only the data of one conversion matrix M can be cached. However, in FIG. 16, a method is shown by which data of a plural number of conversion matrixes M are cached. A matrix cache 1000 includes for each weight: boxes 1010, 1020, and 1030 for the weight values; conversion matrix data boxes 1012, 1022, and 1032; and pointers 1014, 1024, and 1034 to the next data.

Figure 16:
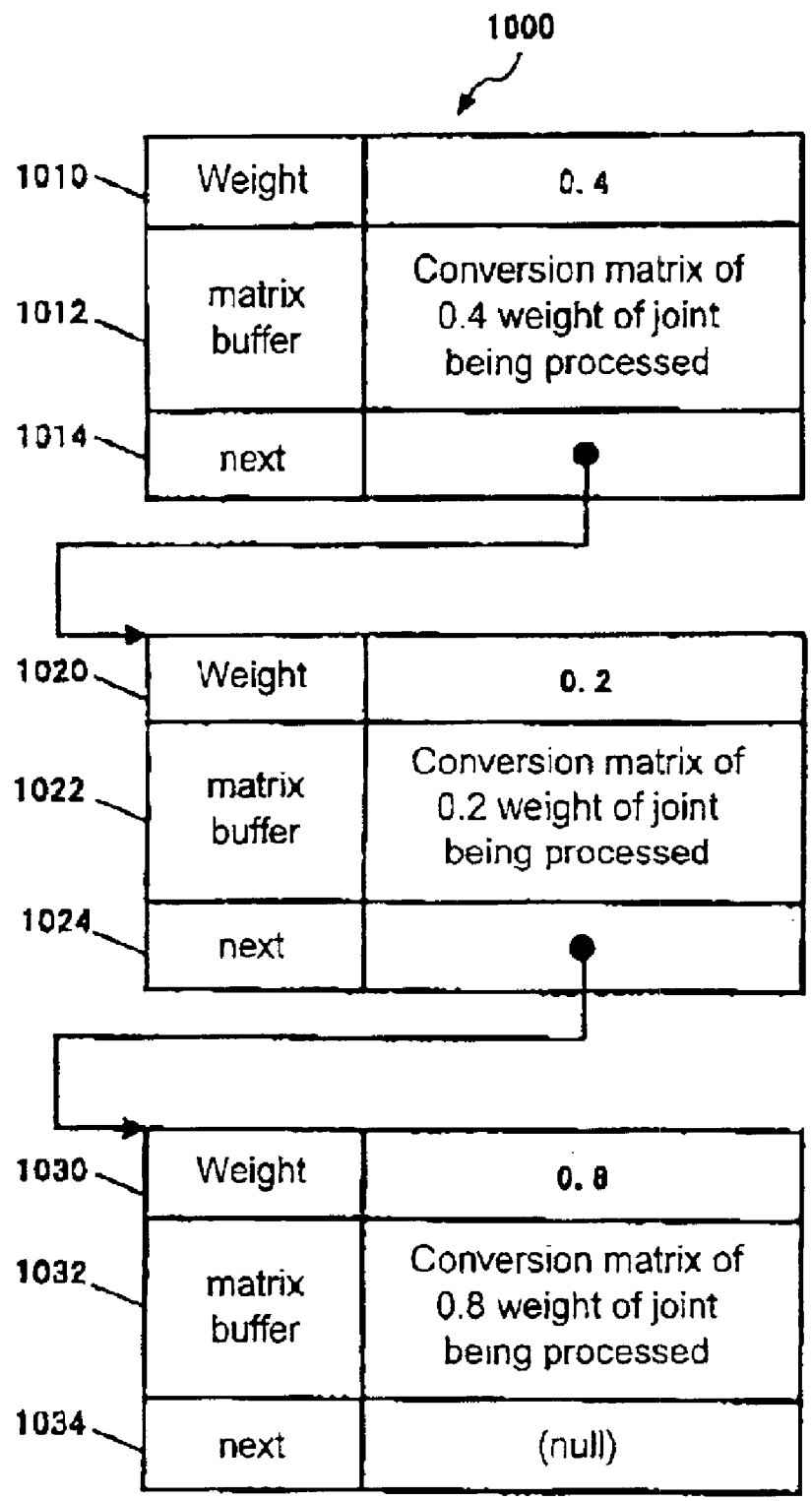
FIG. 16 is an example table of a matrix cache.

In the example of FIG. 16, conversion matrixes are stored for weights of 0.4, 0.2 and 0.8. As for the last data, a null is stored in place of a pointer to the next data.

In the case where a new vertex is to be moved (FIG. 13: step S37) and the state of the matrix cache 1000 as shown in FIG. 16 is evaluated, first the matrix cache 1000 is used for reference. A determination is made whether the weight value of the new vertex is in agreement with one of weight values stored in the boxes 1010 to 1030 for the weight of the matrix cache 1000.

In the case the weight value of the new vertex is in agreement with one of the weight values stored in the boxes 1010 to 1030 for the weight of the matrix cache 1000, the data of the corresponding conversion matrix M stored in the boxes 1012, 1022 and 1032 of the conversion matrix M can be used for the new vertex. Therefore, the data is read from the matrix cache 1000, and the conversion matrix read is used to move the vertex.

On the other hand, in the case where the weight value of the new vertex is not in agreement with any of weight values stored in the boxes 1010, 1020 and 1030 for the weight of the matrix cache 1000, a new conversion matrix M is calculated in the same manner as described above. And the new data, namely the new vertex weight and the calculated conversion matrix M, are added to the matrix cache 1000.

When the matrix cache 1000 as shown in FIG. 16 is used, if the weight for each vertex is defined in hierarchies, the hit rate of the matrix cache 1000 increases and both the speed and capacity increase. Weights in hierarchies for example are arranged so that they can be set within a range from 0.0 to 1.0, in hierarchies of 0.2. For example it is arranged that weights other than a multiple of 0.2 such as 0.1 and 0.79 cannot be set.

When the matrix cache 1000 as shown in FIG. 16 is used, it works effectively even if the vertex indexes, unlike those in the matrix cache 900 of FIG. 15, are not sorted by the vertex weight. However, since a plural number of data exist in the matrix cache 1000, a process of searching data from matrix cache 1000 is necessary.

Figure 17:
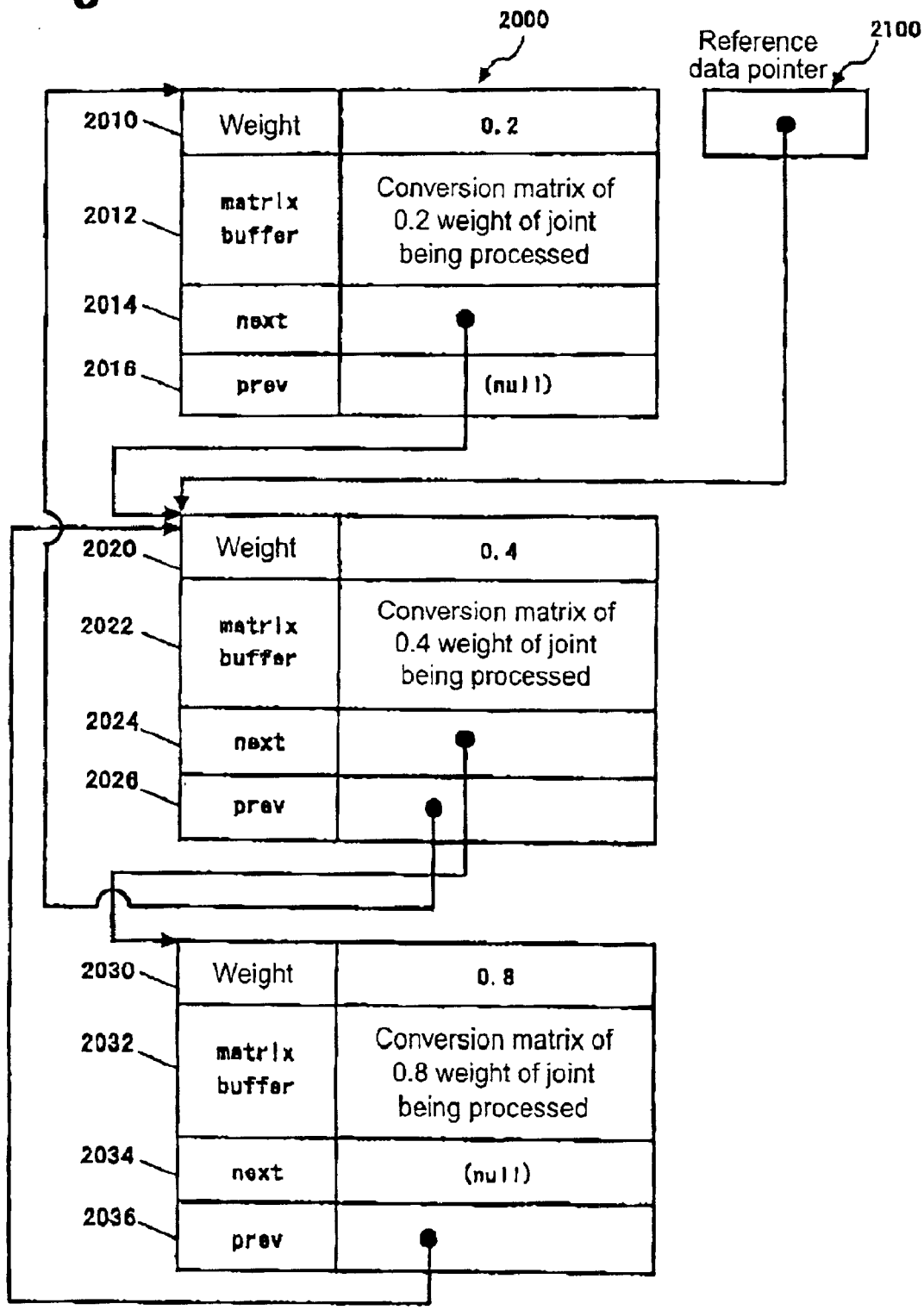
FIG. 17 is an example table of a matrix cache.

To increase the search process speed of the matrix cache 1000, the following process can be applied. FIG. 17 shows schematic representations of a plural number of conversion matrix caches that can be searched at high speeds. In the matrix cache 2000 shown in FIG. 17, the data for every weight includes; weight boxes 2010, 2020, and 2030, conversion matrix data boxes 2012, 2022, and 2032, next data pointers (next) 2014, 2024, and 2034, and previous data pointers (prev) 2016, 2026, and 2036.

In the example of FIG. 17, conversion matrix data are stored for the cases of weights of 0.2, 0.4, and 0.8. The conversion matrix with a weight of 0.2 is the head data, and therefore a "null" is stored in the previous data pointer 2016. The conversion matrix with a weight of 0.8 is the last data, and therefore a "null" is stored in the next data pointer 2034.

The matrix cache 2000 is always sorted by the weight values. That is to say, in the case a conversion matrix data of a weight is to be added, the weight of each data in the matrix cache 200 is compared with the weight of the conversion matrix thereof. The comparison is performed in the order of the data having the lower weight in the matrix cache 2000. When the data has the weight lower than that of the conversion matrix, the data of the conversion matrix is added before the data.

In the next data pointer 2014 is stored a pointer indicating the position of the data of a weight of 0.4. In the next data pointer 2024 is stored a pointer indicating the position of the data of a weight of 0.8. In the previous data pointer 2036 is stored a pointer indicating the position of the data of a weight of 0.4. In the previous data pointer 2026 is stored a pointer indicating the position of the data of a weight of 0.2.

For example, when a conversion matrix data of a weight of 0.6 is to be added in the state of data shown in FIG. 17 being stored, the data of the weight of 0.6 is added next to the data of a weight of 0.4 and before the data of a weight of 0.8. At that time, a pointer indicating the position of the data of the weight of 0.6 is stored in the pointer 2024 to the next data of the weight of 0.4. A pointer indicating the position of the data of the weight of 0.6 is stored in the pointer 2034 to the previous data of the weight of 0.8.

In the example of FIG. 17, in addition to the matrix cache 2000, a reference data pointer 2100 is provided to indicate the data used for reference immediately before. In the case data is stored in the matrix cache 2000 and the data in the matrix cache 2000 is used for reference, pointers directed to the data are stored in the reference data pointer 2100.

A data structure of FIG. 17 is prepared and the vertex indexes of FIG. 5 are sorted by the vertex weight data. In the case a new vertex is to be moved (FIG. 13: step S37), first the reference data pointer 2100 is used for reference. And the data in the matrix cache 2000 indicated with the reference data pointer 2100 is used for reference. The weight of the vertex to be processed is compared with the weight of the data used for reference.

When the two weights are in agreement as a result of the comparison, the coordinates of the vertex are converted with the conversion matrix of the data used for reference. When the weight of the vertex to be processed is greater than that of the data used for reference, data next to the data used for reference is used for reference. When the weight of the vertex to be processed is smaller than that of the data used for reference, data before the data used for reference is used for reference.

Thereafter, the weight of the data used for reference is compared in succession with the weight of the vertex to be processed. Where the next data is used for reference on the assumption that the weight of the vertex to be processed is greater than the weight of the data used for reference, and as a result of comparison with the next data it is determined that the weight of the vertex to be processed is smaller than the weight of the data used for reference, it is determined that the intended conversion matrix does not exist in the matrix cache 2000. In that case, data of the conversion matrix of the newly calculated weight is stored before the data used last for reference.

Where the weight of the vertex to be processed is determined to be greater than the weight of the data used for reference but the pointer to the next data is null, it is determined that an intended conversion matrix does not exist in the matrix cache 2000. In that case, data of the conversion matrix of the newly calculated weight is stored next to the data used last for reference.

Likewise, in the case that the next data is used for reference on the assumption that the weight of the vertex to be processed is smaller than the weight of the data used for reference, and the weight of the vertex to be processed is determined to be greater than the weight of the data used for reference as a result of comparison with that of the previous data, it is determined that the intended conversion matrix does not exist in the matrix cache 2000. In that case, data of the conversion matrix of the newly calculated weight is stored next to the data used last for reference.

In the case the weight of the vertex to be processed is determined to be smaller than the weight of the data used for reference but the pointer to the previous data is null, it is determined that an intended conversion matrix does not exist in the matrix cache 2000. In that case, data of the conversion matrix of the newly calculated weight is stored before the data used last for reference.

Providing the reference data pointer 2100 as shown in FIG. 17 and sorting in advance the vertex indexes of FIG. 5 with the vertex weight data, it is possible to detect intended data in an early hierarchy and increase the processing speed.

Sorting and arranging the data in the matrix cache 2000 according to the weight and providing the data pointers directed to both of the previous and next data make it unnecessary to search for all the data. That is to say, since the data are sorted, the data searching may be made in the increasing or decreasing order of weight depending on the result of comparison of data weights first used for reference. As a result, the search process speed is increased.

As described above, the introduction of the matrix cache reduces the amount of calculation processing of the conversion matrix M and increases the processing speed.

As described above, when the three-dimensional object having a shape determined with a plurality of vertexes is to be transformed, the rotation angle of each joint in a virtual skeleton corresponding to the three dimensional object is obtained at every time frame(step S27). The virtual skeleton is constituted with a plurality of joints, with the plurality of vertexes corresponding to any one of the plurality of joints. The obtained rotation angle of the joint corresponding to each vertex is changed according to the weight predefined for the vertex, and the vertex is moved according to the changed rotation angle at every time frame (step S37).

The rotation angle of the vertex is obtained by changing the rotation angle of the joint corresponding to the vertex according to the weight predefined to the vertex. The vertex is moved according to the rotation angle of the vertex.

Therefore, the three-dimensional object can be smoothly transformed without calculating two pieces of position information for every vertex in a virtual three-dimensional space. Use of quarternions especially enables the rotation of vertexes with a shortest distance between the vertex positions before and after transformation.

Recently the number of vertexes defined for three-dimensional objects has increased greatly because more realistic CG images are desired. According to the present invention, since only one vertex conversion suffices for one vertex in the present invention, a small increase in the processing amount suffices for one vertex.

In other words, even when the three-dimensional object after transformation is not required to be smooth in shape, the transformation requires one conversion for every vertex. Therefore, even if present invention is applied to maintain a smooth shape, the number of vertex conversions remains unchanged.

When the present invention is to be applied, the conversion matrix must be calculated according to the rotation angle of the joint and the weight given to the vertex. However, the conversion matrix calculating process need not be made for every vertex when the matrix caches shown in FIGS. 15 to 17 are used. Therefore, the present invention makes it possible to hold down the increase in the processing amount required for making the post-transformation shape smooth in spite of an increase in the number of vertexes.

In the above embodiment, each vertex is rotated with the same rotary axis as that of the rotation angle of the joint. Therefore, the vertex can be moved while maintaining the distance between the joint to the vertex. For example, since the human knee has bones, the distance between the knee joint to the knee top of the knee portion of a three-dimensional object simulating a human must be kept constant. Applying the invention makes transformation of the joint in the knee portion possible while maintaining the swell of the knee portion.

Displayed Example

Figure 18:
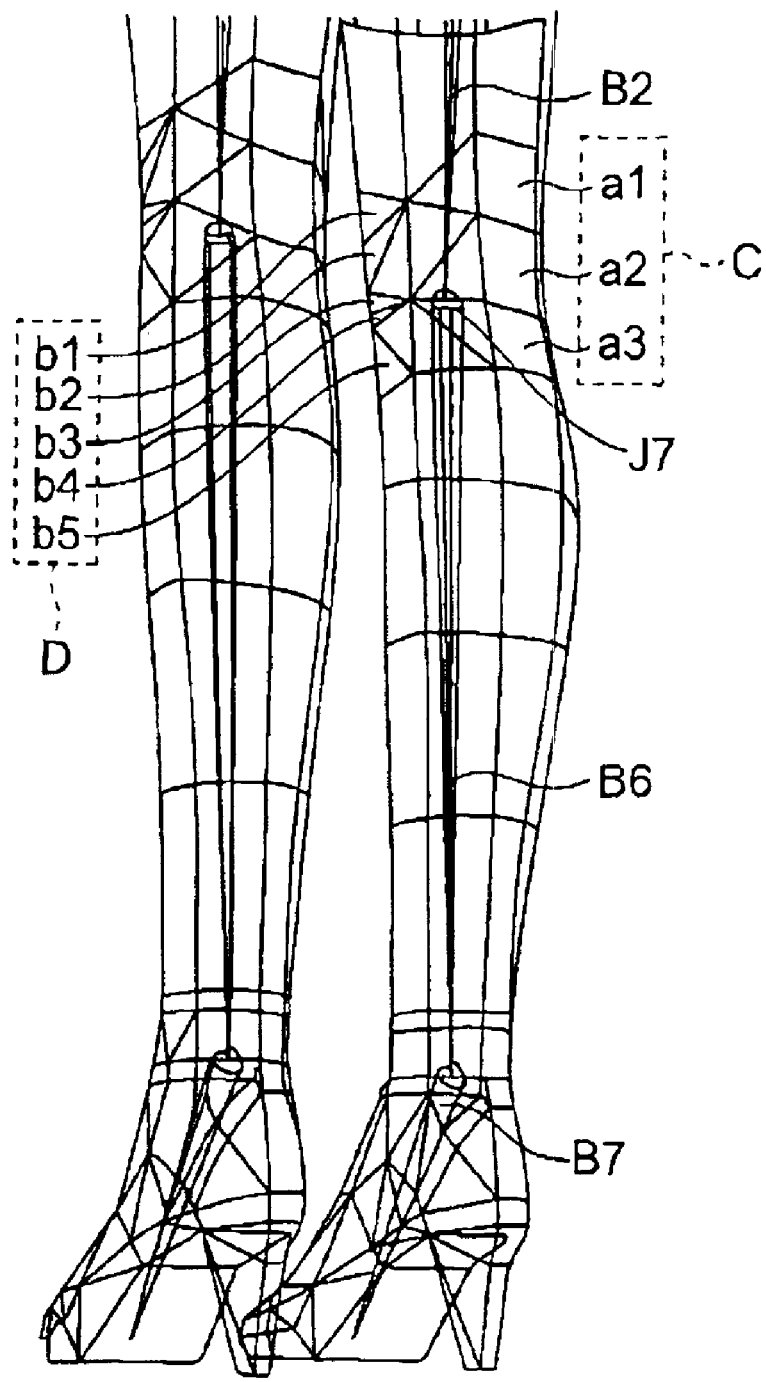
FIG. 18 shows a polygon model of the leg portion of a human shape three-dimensional object in a basic attitude.

FIG. 18 shows a polygon model of the leg portion of a human shaped three-dimensional object in a basic attitude. It shows, for reference, a joint J7 and bones B2, B6 and B7 (for the right leg only) of a virtual skeleton (shown in FIG. 6). In FIG. 18, portions C and D are shown that are greatly affected when the joint J7 is rotated. Changes in three rectangular polygons a1, a2 and a3 of the portion C and five rectangular polygons b1 to b5 of the portion D are observed.

Figure 19:
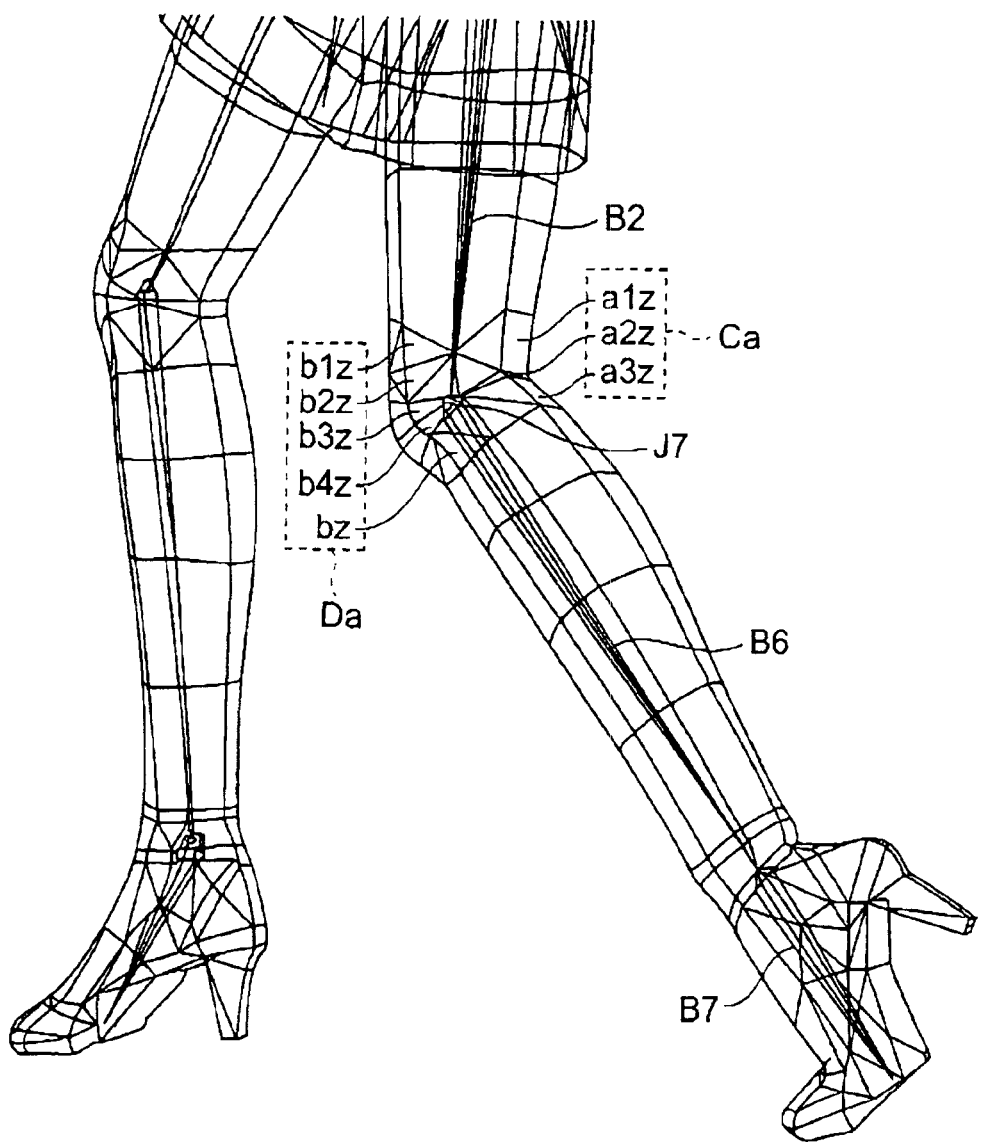
FIG. 19 shows the polygon model of the three-dimensional object in a state of the knee bent.

FIG. 19 shows a state as a result of rotating the joint J7 by the use of present invention. As described above, each vertex of the three-dimensional object is moved by a rotation angle for the vertex obtained by changing the rotation angle of a corresponding joint according to a weight predefined for the vertex. The vertexes of the polygons of the portions C and D shown in FIG. 18 correspond to the joint J7. The portion C is moved to the portion Ca, and the portion D to Da.

The polygon a1z of the portion Ca corresponds to the polygon a1 of FIG. 18, the polygon a2z to the polygon a2 of FIG. 18, and the polygon a3z to the polygon a3 of FIG. 18. The polygon a2z is greatly affected by the rotation of the joint J7 and its area has become very small. As seen in FIG. 19, polygons a1z and a3z have become respectively smaller in area than the corresponding polygons a1 and a3.

The polygon b1z of the portion Da corresponds to the polygon b1 of FIG. 18, the polygon b2z to the polygon b2 of FIG. 18, the polygon b3z to the polygon b3 of FIG. 18, b4z to the polygon b4 of FIG. 18, and the polygon b5z to the polygon b5 of FIG. 18. In contrast to the portion Aa, the portion Ba is greatly extended. The polygons b3z and b4z are greatly affected by the rotation of the joint J7 and have become greater than the corresponding polygons b3 and b4. The polygons b1z, b2z, and b5z have also become greater than polygons b1, b2, and b5.

Figure 20:
FIG. 20 shows an image example produced from the polygon model of FIG. 18.
Figure 21:
FIG. 21 shows an image example produced from the polygon model of FIG. 19.

From the polygon model of FIG. 18, an image can be produced as shown in FIG. 20. A three-dimensional object is expressed in a smooth shape. On the other hand, an image as shown in FIG. 21 is obtained from the polygon model shown in FIG. 19. When the invention is used to transform a three-dimensional object, as seen in FIG. 21, the vertexes of the polygon in the portion Ca are not buried in the three-dimensional object, and the polygon does not become too large. The three-dimensional object as a whole is drawn in a smooth shape.

The following modifications are applicable to the above embodiments.

(Modification 1)

The animation data 700 is assumed to include the rotation angle data for all the frames. However, it is not necessary to include the rotation angle data for all the frames. The rotation angle of a frame lacking data may be determined by interpolating the rotation angles of frames located before and after the frame lacking the data.

(Modification 2)

The above description is made on the assumption of a triangular polygon. However, the present invention may be applied to models with polygons comprising more than three vertexes for transforming three-dimensional objects by moving vertexes.

(Modification 3)

The above embodiment shows an example in which conversion matrixes are created. However, processing without using the matrixes is also possible. However, the conversion matrix is advantageous because it can process parallel movements at the same time.

(Modification 4)

In the above embodiment, the weight is reflected by the use of quarternions and sphere-linear interpolation. However, a simple linear interpolation may also be used in place of the sphere-linear interpolation. The term simple linear interpolation means a process of linear interpolation between variables of two quarternions according to their weights. Since the simple linear interpolation is simpler than the sphere-linear interpolation, the use of the simple linear interpolation simplifies the process. Even if the simple linear interpolation is used, three-dimensional objects are not displayed in unnatural shapes on the video game screen as long as the changes in the angle are limited within a certain extent.

(Modification 5)

Changing Hardware for Use:

FIG. 1 is an example arrangement which may be modified in various ways. Provision of the communication interface 115 is optional. Since the present invention is not directly related to the sound processing, provision of the sound processing section 109 is not essential.

The CD-ROM is merely an example of recording medium, and may be replaced with other recording media such as; internal memory (a ROM for example), DVD-ROM, memory cartridge, floppy disk, magnetic disk, and DVD-RAM. In that case, it is necessary to read the CD-ROM drive 113 with a corresponding medium to make it a readable drive.

Moreover, the invention is described above as embodied with a computer program. However, the invention may be embodied with a combination of a computer program and a dedicated device such as an electronic circuit, or with only the dedicated device such as the electronic circuit.

While the invention is concretely described above by way of embodiments, the invention is not limited to those embodiments but may be embodied in various ways within the scope and spirit of the invention. For example, while the above description of embodiment of the invention is made with a home game apparatus as a platform, the platform may be realized with an ordinary computer, or an arcade game apparatus. It is also conceivable that a mobile information terminal, car navigation system, etc. are used as the platform.

Moreover, the recording medium for supplying the programs and data for putting the invention to practical use is not limited to the CD-ROM that can be inserted into and removed from the computer or the game apparatus. That is to say, it may be arranged, as shown in FIG. 1, such that the programs and data for putting the invention to practical use are recorded in the memory on the other apparatus side on the network 151 connected through the interface 115 and the communication line 141, stored in order as required in the RAM 105, and used.

According to the invention as described above, the shape of the three-dimensional object after being transformed is smooth since the rotation angle of each vertex is calculated from the rotation angle of each joint and the weight defined to the vertex, and the vertex is rotated through the calculated angle. Moreover, the vertex conversion for each vertex is made only once, so that the increase in the amount of processing can be restricted even if the number of vertexes of the three-dimensional object increases.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A computer-readable recording medium for a video game, with the medium recording a video game program for transforming a three-dimensional object having a shape defined with a plurality of vertexes, the program causing the computer, to obtain the rotation angle of each joint in a virtual skeleton of three-dimensional object constituted with a plurality of joints with each of the plurality of vertexes made to correspond to any one of the plurality of joints according to animation data defining the movement of the virtual skeleton at every frame display period; and to calculate the rotation angle of the vertex on the basis of the obtained rotation angle of each joint and a weight predefined for the vertex corresponding to the joint, and to move the vertex according to the rotation angle at every frame display period, wherein the vertex corresponding to the one joint is sorted with the weight predefined for the vertex; and in the movement of the vertex, a determination is made whether the same weight as that predefined for the vertex moved immediately before is defined for the vertex be moved;

when it is determined that the same weight as that predefined for the vertex moved immediately before is not defined for the vertex to be moved, the rotation angle of the vertex to be moved is calculated on the basis of the obtained rotation angle of the joint corresponding to the vertex to be moved and the weight predefined for the vertex to be moved, and data on the rotation angle is stored;

the vertex to be moved is moved according to the stored data on the rotation angle, and when it is determined that the same weight as that predefined to the vertex moved immediately before is defined for the vertex to be moved, the vertex to be moved is moved according to the stored data on the rotation angle.

2. A computer-readable recording medium for a video game, with the medium recording a video game program for transforming a three-dimensional object having a shape defined with a plurality of vertexes, the program causing the computer;

to obtain the rotation angle of each joint in a virtual skeleton of the three-dimensional object constituted with a plurality of joints with each of the plurality of vertexes made to correspond to any one of the plurality of joints according to animation data defining the movement of the virtual skeleton at every frame display period; and to calculate the rotation angle of the vertex on the basis of the obtained rotation angle of each joint and a weight predefined for the vertex corresponding to the joint, and to move the vertex according to the rotation angle at every frame display period, wherein in the movement of the vertex, a determination is made whether the same weight as that predefined for the already moved vertex among the vertexes corresponding to the same joints is defined for the vertex to be moved;

when it is determined that the same weight as that predefined for the already moved vertex among the vertexes corresponding to the same joints is not defined for the vertex to be moved, the rotation angle of the vertex is calculated according to the obtained rotation angle of the joint corresponding to the vertex to be moved and the weight predefined for the vertex to be moved, and the data on the rotation angle is associated with the weight of the vertex and stored;

the vertex to be moved is moved according to the calculated rotation angle; and when it is determined that the same weight as that predefined for the already moved vertex among the vertexes corresponding to the same joints is defined for the vertex to be moved, the data on the rotation angle stored as associated with the weight predefined for the vertex to be moved is obtained, and the vertex to be moved is moved according to the data on the rotation angle.

* * * * *